(12) United States Patent
Huang et al.

(10) Patent No.: US 11,765,182 B2
(45) Date of Patent: Sep. 19, 2023

(54) LOCATION-AWARE AUTHENTICATION

(71) Applicant: MICROSOFT TECHNOLOGY LICENSING, LLC, Redmond, WA (US)

(72) Inventors: Olena Lanxin Huang, Bellevue, WA (US); Jia Le He, Redmond, WA (US); Samir Vasantbhai Shah, Bellevue, WA (US); Andrew Pickering, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 17/079,011

(22) Filed: Oct. 23, 2020

(65) Prior Publication Data

US 2022/0131871 A1    Apr. 28, 2022

(51) Int. Cl.
*H04L 9/40* (2022.01)
*G06F 16/22* (2019.01)

(52) U.S. Cl.
CPC ............ *H04L 63/107* (2013.01); *G06F 16/22* (2019.01); *H04L 63/08* (2013.01); *H04L 63/102* (2013.01)

(58) Field of Classification Search
CPC combination set(s) only.
See application file for complete search history.

(56) References Cited

U.S. PATENT DOCUMENTS

| | | | |
|---|---|---|---|
| 9,444,805 B1 | 9/2016 | Saylor et al. | |
| 10,206,099 B1 * | 2/2019 | Trinh | H04W 4/021 |
| 10,225,264 B2 * | 3/2019 | Grim | H04W 12/06 |
| 2014/0053250 A1 * | 2/2014 | Wethington | H04W 4/021 726/5 |
| 2014/0059695 A1 * | 2/2014 | Parecki | H04W 12/08 726/26 |
| 2014/0162692 A1 * | 6/2014 | Li | H04L 67/133 455/456.3 |
| 2015/0271156 A1 | 9/2015 | Ronca | |
| 2015/0350827 A1 * | 12/2015 | Birch | H04W 4/021 455/456.1 |
| 2015/0373030 A1 | 12/2015 | Bank et al. | |
| 2017/0034178 A1 * | 2/2017 | Hansen | H04W 4/021 |

(Continued)

OTHER PUBLICATIONS

"International Search Report and Written Opinion Issued in PCT Application No. PCT/US21/048571", dated Dec. 14, 2021, 10 Pages.

(Continued)

*Primary Examiner* — Harris C Wang
(74) *Attorney, Agent, or Firm* — WORKMAN NYDEGGER

(57) ABSTRACT

A system for location-aware authentication is configured to receive an authentication request associated with an identifier of a user for accessing an application and retrieves user information associated with the identifier and the application. The system then determines that the user information includes a geofence and information associated with a device of the user. Based on the geofence and the device information, the system sends a geolocation data request to the device, causing the device to gather and send the device's current geolocation data to the computing system. A data structure is generated to store data related to the device's current geolocation and sent to the application, which in turn causes the application to grant or deny the authentication request.

15 Claims, 23 Drawing Sheets

(56) References Cited

U.S. PATENT DOCUMENTS

| | | | |
|---|---|---|---|
| 2017/0063857 A1* | 3/2017 | Rykowski | H04L 63/105 |
| 2018/0121956 A1* | 5/2018 | DeLuca | H04W 4/021 |
| 2018/0213405 A1* | 7/2018 | Jung | H04W 12/069 |
| 2019/0289017 A1* | 9/2019 | Agarwal | H04L 9/12 |
| 2020/0186520 A1* | 6/2020 | Oberheide | G06Q 20/356 |
| 2021/0058383 A1* | 2/2021 | Colon | H04W 4/029 |

OTHER PUBLICATIONS

"About Popup Asking User if they Want to Continue Allowing the App to Use Location in the Background", Retrieved from https://developer.apple.com/forums/thread/48092, Retrieved on Oct. 8, 2020, 3 Pages.

Miller, Chance, "iOS 13 Now Shows a Map of where Apps have been Tracking you when Requesting Permission", Retrieved from https://9to5mac.com/2019/06/08/ios-13-location-permissions/, Jun. 8, 2019, 8 Pages.

* cited by examiner

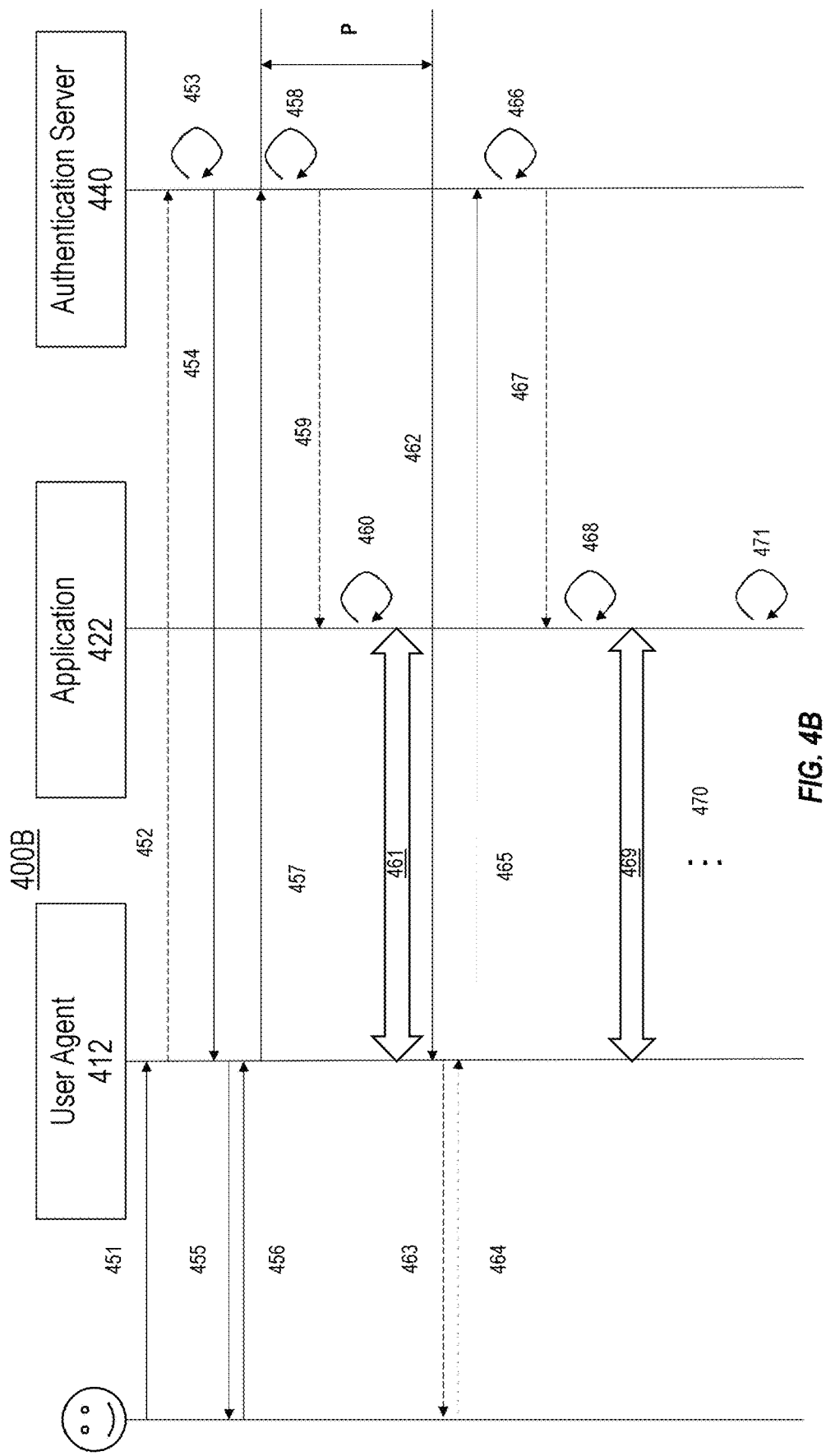

LOCATION-AWARE AUTHENTICATION

BACKGROUND

Digital identity is an entity's online presence, encompassing personal identifying information (PII) and ancillary information, which can be interpreted as the codification of identity names and attributes of a physical instance in a way that facilitates processing. Identity management, also known as identity and access management, is a framework of policies and technologies for ensuring that the proper people in an enterprise have the appropriate access to technology resources. Identity management systems are capable of not only identifying, authenticating, and authorizing individuals who will be utilizing technology resources, but also the hardware and applications employees need to access.

Existing identity management systems often involve one or more of the following functions: (1) a pure identity function; (2) a user access function; (3) a service function, and/or (4) identity federation. The pure identity function includes the creation, management, and deletion of identities without regard to access or entitlements. The user access may be a login function. For example, a smart card and its associated data may be used by a customer to log in to service(s). The service function may include delivering a personalized, role-based, online, on-demand, and/or multimedia content, and/or providing presence-based services to users and their devices. The identity federation includes relying on federated identity to authenticate a user without knowing their password.

Identity and access management solutions have become more prevalent and critical in recent years as regulatory compliance requirements have become increasingly rigorous and complex.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to location-aware authentication of user activities, which may be implemented at an application, an identity service or server and/or users' personal device(s). The system and method of location-aware authentication disclosed herein allows applications to set geofences for various user activities, which enhances the security of identity management and further protects highly sensitive documents and proprietary information.

In embodiments, a computing system (which may be associated with the identity service or server or an application having identity management functions) is configured to receive an authentication request associated with an identifier of a user for accessing an application. Based on the authentication request, the computing system retrieves user information associated with the identifier and the application. The computing system then determines that the user information includes a geofence and information associated with a device of the user. The geofence requires the user to be within a predetermined area for the authentication request to be granted. Based on the geofence and the information associated with the device of the user, the computing system sends a geolocation request to the device, causing the device to gather and send the device's current geolocation data to the computing system. Based on the device's current geolocation data received from the device, the computing system generates a data structure storing at least data associated with the device's current geolocation. The data structure is then sent to the application, causing the application to grant or deny the authentication request.

In some embodiments, the authentication request includes a request to login to a user account, and the computing system determines whether the user account is associated with a geofence that requires the user to be within the geofence for the login request to be granted. In response to determining that the user account is not associated with any geofence, the computing system refrains from gathering the device's current geolocation data.

In some embodiments, the authentication request includes a request for access to a portion of data, and the computing system determines whether the portion of data is associated with a geofence that requires any user to be within the geofence for the data access request to be granted. In response to determining that the portion of data is not associated with any geofence, the computing system refrains from gathering the device's current geolocation data.

In some embodiments, the computing system is further configured to determine whether the device is located within the geofence, and the data structure stores a binary field indicating whether the device is within the geofence. Only when the data structure indicates that the device is located within the geofence, the authentication request is granted. The geolocation data associated with precise geolocation of the device is deleted after the determination of whether the device is located within the geofence.

In some embodiments, before the device gathers the geolocation data, the device is caused to generate a consent notification. The user may consent to the gathering of the geolocation data or deny it. The geolocation data is gathered and sent to the computing system only after the user consents to the gathering of the geolocation data.

In some embodiments, a plurality of devices are associated with the user. In such a case, the computing system determines whether one of the plurality of devices is a primary device. When the primary device exists, the computing system sends the geolocation data request or the consent request to the primary device. When the primary device does not exist, the computing system sends the geolocation data request or the consent request to each of the plurality of devices.

In some embodiments, the data structure (e.g., a token) is set to expire in a predetermined period. In response to the expiration of the data structure, the computing system is configured to send a second geolocation data request to the device, causing the device to gather the device's current geolocation data again. In response to receiving the device's current geolocation data again, the computing system generates a second data structure storing data associated with the device's current geolocation data and sends the second data structure to the application.

In some embodiments, the computing system is further configured to obtain an IP address of the device. In response to detecting that the IP address of the device changes, the computing system revokes the data structure and sends a second request to the device, causing the device to gather the device's current geolocation data again. In response to receiving the device's current geolocation data again, the computing system generates a second data structure storing data associated with the device's current geolocation data and sends the second data structure to the application.

The geolocation data may be obtained from various hardware resources coupled to the device, including (but not limited to) (1) a global positioning system (GPS), (2) a Wi-Fi access point connected to the device, and/or (3) another device connected to the device via Bluetooth connection.

The definition of the geofence may be based on at least one of the following: (1) a particular country, a political state, or a territory of an organized political community under one civil government, (2) a particular building, (3) a particular campus of a particular organization, (4) an area of a latitude-longitude polygon, or (5) an area of a circle having a particular radius around a particular latitude-longitude center.

Additional features and advantages will be set forth in the description which follows, and in part will be obvious from the description or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 4B illustrates an exemplary communication pattern that may occur in the location-aware authentication system of FIG. 4A;

DETAILED DESCRIPTION

The embodiments described herein are related to location-aware authentication of user activities, which may be implemented at an application, an identity server and/or users' personal device(s).

Figure 1:
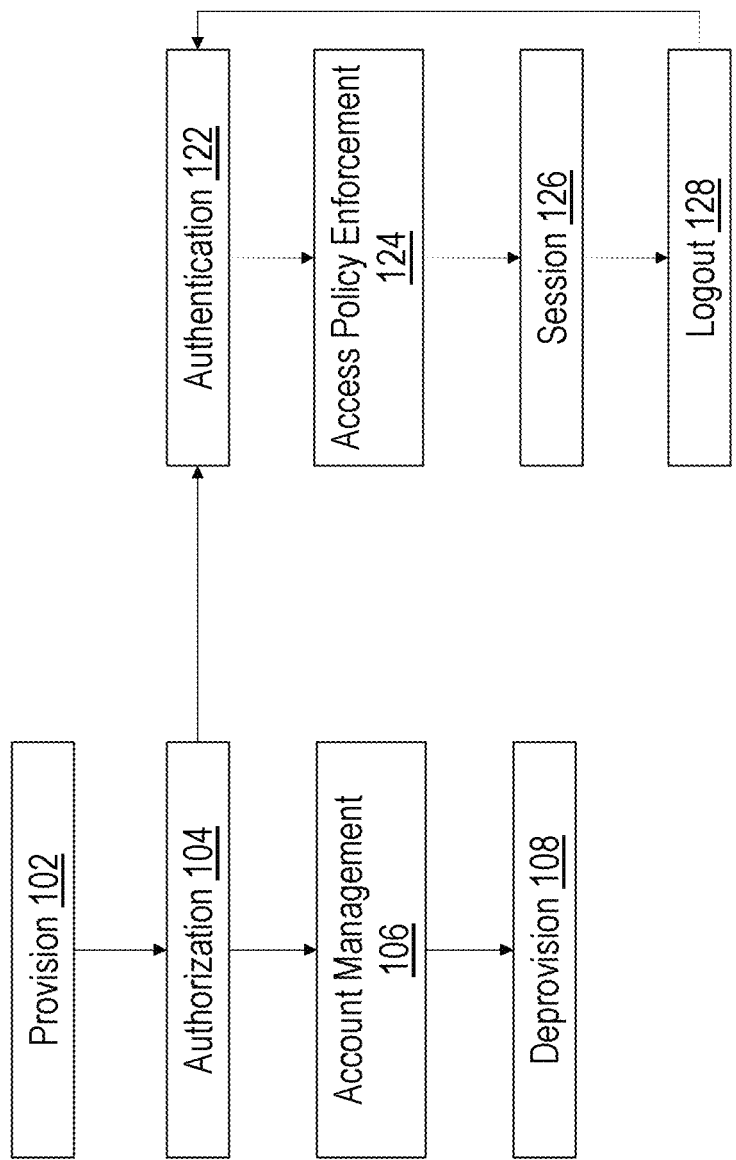
FIG. 1 illustrates common events in a life of an identity.

Since the principles described herein are related to identity management and authentication of identities, a brief introduction to common events in a life of an identity is provided hereafter. FIG. 1 illustrates common events in a life of an identity. The first event in the life of an identity is its creation 102 (also referred to as provision). The provision event 102 often includes obtaining or assigning a unique identifier for the identity and creating an account, and associating identity profile attributes with the account, which may be achieved by having users register, importing identity information from a legacy system, or leveraging an external identity service.

Once an account is created, it is often necessary to specify what the account can do in the form of privileges. An event of granting of privileges that govern what an account is allowed to do is an authorization event 104. For example, when a new student's account is created, the new student's account is authorized to register courses and review course materials of the registered courses. However, the student's account would not be authorized to access course materials of the not-registered courses. The student's account would also not be authorized to access other student's account information.

Once an account is authorized to have certain privileges, a user needs to be authenticated as the owner of the account to access the privileged resources (represented as the authentication event 122). For example, the user may provide an identifier to signify the account they wish to use and enter one or more login credential(s) of the account. The identifier and the one or more credential(s) are validated against the identifier-credential data set registered during the creation 102 of the account. The credential may involve sufficiently distinctive information the user knows (e.g., a password), a device the user controls (e.g., a mobile device), or information the user possesses (e.g., biometric information). For example, before a student can access her online course materials, the student needs to authenticate their identity by entering their username and password established during the registration step (i.e., provision event 102). The username indicates the identifier of the account, and knowledge of the password demonstrates their right to use the account.

In some cases, once a user has been authenticated and associated with an account, it is necessary to enforce access policy to ensure any actions taken by the user are allowed by the privileges they have been granted, which is referred to as access policy enforcement 124. The authorization 104 specifies what a user or entity is allowed to do, and access policy enforcement 124 checks that a user's requested actions are allowed by the privileges they have been authorized to use. For example, when a student requests to access materials of a course that they have not registered, they would be denied as they are not authorized to access the requested data. In such a case, the application might display a message indicating that they are not allowed to view those materials, perhaps with information on how to register the course to be able to view those materials.

Once a user has been authenticated and authorized, they may perform various activities within an application. Some applications only allow a user to remain active for a limited period of time before requiring the user to authenticate again, which is done by managing a session 126 for the user. A session tracks various information associated with the user's activities and authentication mechanism, including (but not limited to) the time the user has been active or the authentication strength level. As such, the application knows when the user should be prompted to reauthenticate. The length of time a user is allowed to remain active before reauthentication is known as a session limit or session timeout. The session timeout settings will typically vary by the sensitivity of the data in the application. The session timeout helps protect against users who walk away from their screen without logging off and/or identity information that may have changed since the session was created. In some cases, the session timeout requires a user to periodically reauthenticate at the keyboard. Alternatively, the session timeout may trigger a pop-up alert asking whether the user wants to confirm or renewal the account status.

After a user is finished their use of the application, the user may terminate their session by logging out 128. After logging out, if the user returns to the application, they will have to authenticate again before being granted access again.

During the course of an identity's lifetime, the various attributes of the user profile for the identity may be modified, which is referred to as account management 106. For example, a user may update their email address or phone number. In some cases, a user may need to change their password periodically. As another example, when an employee is promoted, the employee's profile might be updated to reflect their new position or new privilege corresponding to the new position.

Finally, there may be situations when an account needs to be closed. In such a case, the account and associated identity information are deprovisioned 108 so that it can no longer be used. In some embodiments, the deprovision 108 includes completely deleting the account and the associated identity information. Alternatively, deprovision 108 merely disables the account, yet still preserves information for various purposes. For example, when a bank account is closed, the bank may be required to keep sufficient account information for a period of time for tax or auditing purposes.

Amongst the above-described events of an identity, the principles described herein are mostly related to the authorization 104 and authentication 122 events. In particular, the principles described herein include improved authorization and authentication mechanisms that provide enhanced security for protecting important data and/or proprietary applications. In some embodiments, the principles described herein may be implemented at an application that provides its own identity management, authorization, and/or authentication functions. In some embodiments, the principles described herein may be implemented at an identity server that provides identity management, authorization, and/or authentication as a service. FIGS. 2A-3B illustrate exemplary location-aware authorization/authentication systems that are part of or coupled to an application. FIGS. 4A-5B illustrate exemplary authorization/authentication systems that include an identity server.

Figure 2A:
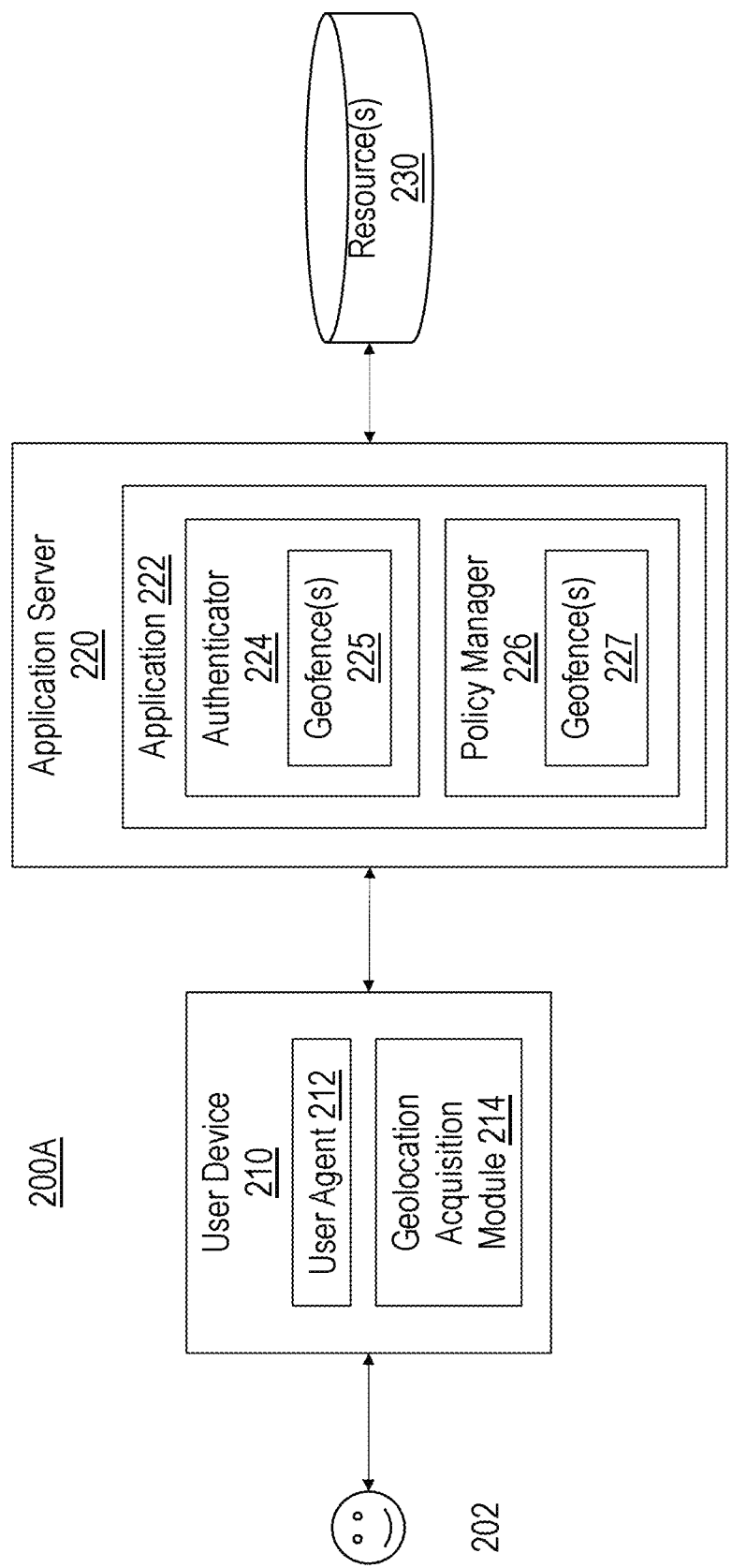
FIG. 2A illustrates an exemplary location-aware authentication system that incorporates the principles described herein.

Referring to FIG. 2A, the location-aware authorization/authentication system 200A includes a user device 210 (e.g., a computing system, a mobile device), an application server 220, and resource(s) storage 230. The user device 210 includes a user agent 212, which may be a native application or a browser. The user device 210 also includes a geolocation acquisition module 214 configured to acquire a current geolocation of the user device 210. In some embodiments, the geolocation acquisition module 214 uses data obtained from a global positioning system (GPS) as a current geolocation of the user device 210. In some embodiments, the geolocation acquisition module 214 uses a Wi-Fi access point, to which the user device 210 is currently connected, to determine a current geolocation of the user device 210. In some embodiments, the geolocation acquisition module 214 uses an identifier of a known device that is connected to the user device 210 via Bluetooth and/or near field communication (NFC) to identify the geolocation of the user device 210. Alternatively, or in addition, the geolocation acquisition module 214 uses a combination of two or more methods (including, but not limited to the above-described methods) to determine the current geolocation of the user device 210.

The application server 220 hosts an application 222 (e.g., a web application), which has access to the resource(s) storage 230. In some embodiments, the resource(s) storage 230 is a local storage coupled to the application server 220. Alternatively, the resource(s) storage 230 is a cloud storage remote to the application server 220. A user 202 uses the user agent 212 installed at the user device 210 to access a user account associated with the application 222 via computer network(s). Before the user 202 is allowed to access the user account associated with the application 222, the user 202 is required to input their identifier and/or credential(s) at the user agent 212, which in turn transmits the user's identifier and credential(s) to the application 222. The application 222 includes an authenticator 224 configured to verify the received identifier and credential(s) with the user data registered during the creation or management of the user account.

In some embodiments, the authenticator 244 may require stronger authentication for certain accounts, including requiring the user 202 to be within one or more predetermined geological boundaries (also referred to as geofence 225). Such a geofence 225 may be set during the provision event 102 of the user identity (see FIG. 1). A geofence may be defined based on (but not limited to) at least one of the following: (1) a particular country, a political state, or a territory of an organized political community under one civil government, (2) a particular building, (3) a particular campus of a particular organization, (4) an area of a latitude-longitude polygon, or (5) an area of a circle having a particular radius around a particular latitude-longitude center. The geofence 225 may be set based on various rules associated with the attributes of the user profile, such as a role of the user account (e.g., an executive account, a high-security-clearance account). When a geofence 225 is associated with the user account, the authenticator 224 is configured to request geolocation data from the user device 210 (causing the geolocation acquisition module 214 to gather the current geolocation data of the user device 210) as one of the credential(s) when the user logs in.

Since the user's geolocation data concerns the user's privacy, the user may be required to consent to the gathering of the user's geolocation data before such data is gathered. For example, the login user interface may provide a notification to the user that the user's geolocation data will be gathered if the user chooses to log in to the account. Receiving the geolocation data, the authenticator 224 verifies whether the user device 210 is within the required geofence. If the user device 210 is within the geofence, the user login request is granted; otherwise, the user login request is denied.

The application 222 may also have a policy manager 226 that manages the access policies for access to data stored in the resource(s) storage 230. In embodiments, the access policies may also include one or more geofence(s) 227, which are configured to restrict the access of certain data to certain geological boundaries. The geofence 227 may be set during the authorization event 104 of FIG. 1. In some cases, the geofence 227 may be set for certain types of data (e.g., high-security data) or certain types of operations of data (e.g., modifying data).

When a geofence 227 is associated with the data that the user tries to access, the policy manager 224 sends a geolocation request to the user device 210, causing the geolocation acquisition module 214 to gather and send the current geolocation data of the user device 210 to the application server 220. Receiving the geolocation data from the user device 210, the policy manager 224 verifies whether the user device 210 is within the geofence 227 defined in the access policies. If the user device 210 is within the geofence, the user's request for access to the data will be granted; otherwise, the user's request will be denied.

Note, gathering geolocation data during the logging in of the user or access management is not mutually exclusive. In some cases, the application may only verify the user's location when the user is authenticated at login time. In some cases, the application may only verify the user's location when the user tries to access data associated with a geofence. Different geofences may be set for different data sets or different types of data. In some cases, the user's location is verified both at the user's login and at the user's access to certain data, and different geofences may be set for user's login and the user's access to the certain data.

Further, in some embodiments, to protect the user's privacy, the user agent 212 may be tasked to determine whether the user is within the geofence, and only send a binary indicator (indicating whether the user is within the geofence) to the application 222. Alternatively, once the authenticator 224 or the policy manager 226 determines whether the user is within the geofence, the geolocation data of the device 210's precise location is deleted, and only a binary indicator, indicating whether the device 210 is within the geofence is logged.

The "geolocation data" of a device used herein includes any data associated with geolocation of a corresponding device, which includes (but is not limited to) data indicating the device's precise location, a range of area, and/or a binary indication, indicating whether the device is within a predefined geofence. A "user's geolocation" used herein is referred to as the geolocation data of the user's device, because the user is assumed to be near the device, of which the geolocation data is gathered.

Since a user's geolocation concerns the user's privacy, in some embodiments, before the geolocation acquisition module 214 gathers and sends the geolocation data, a consent notification may be generated to ask the user whether they allow the application to obtain the device 210's current geolocation data, and the geolocation data is gathered and/or sent only after the user's consent is received. In some embodiments, a session timeout period (e.g., one hour) is set. When the timeout period passes, the user's geolocation is required to be obtained and verified again. In some embodiments, the user consent is required only at the beginning of the first session, and the re-verification of the user's geolocation data in the subsequent sessions is automatically performed. In some embodiments, a user can choose to consent timeout (e.g., one day, one month, one year, etc.). For example, when the user chooses a consent timeout as one month, the user will only be prompted to consent to the geolocation data gathering once per month.

In some embodiments, the application 222 is configured to acquire the user device 210's IP address. When the application 222 detects that the IP address of the user device 210 changes, the application 222 requires a new geolocation verification again.

Figure 2B:
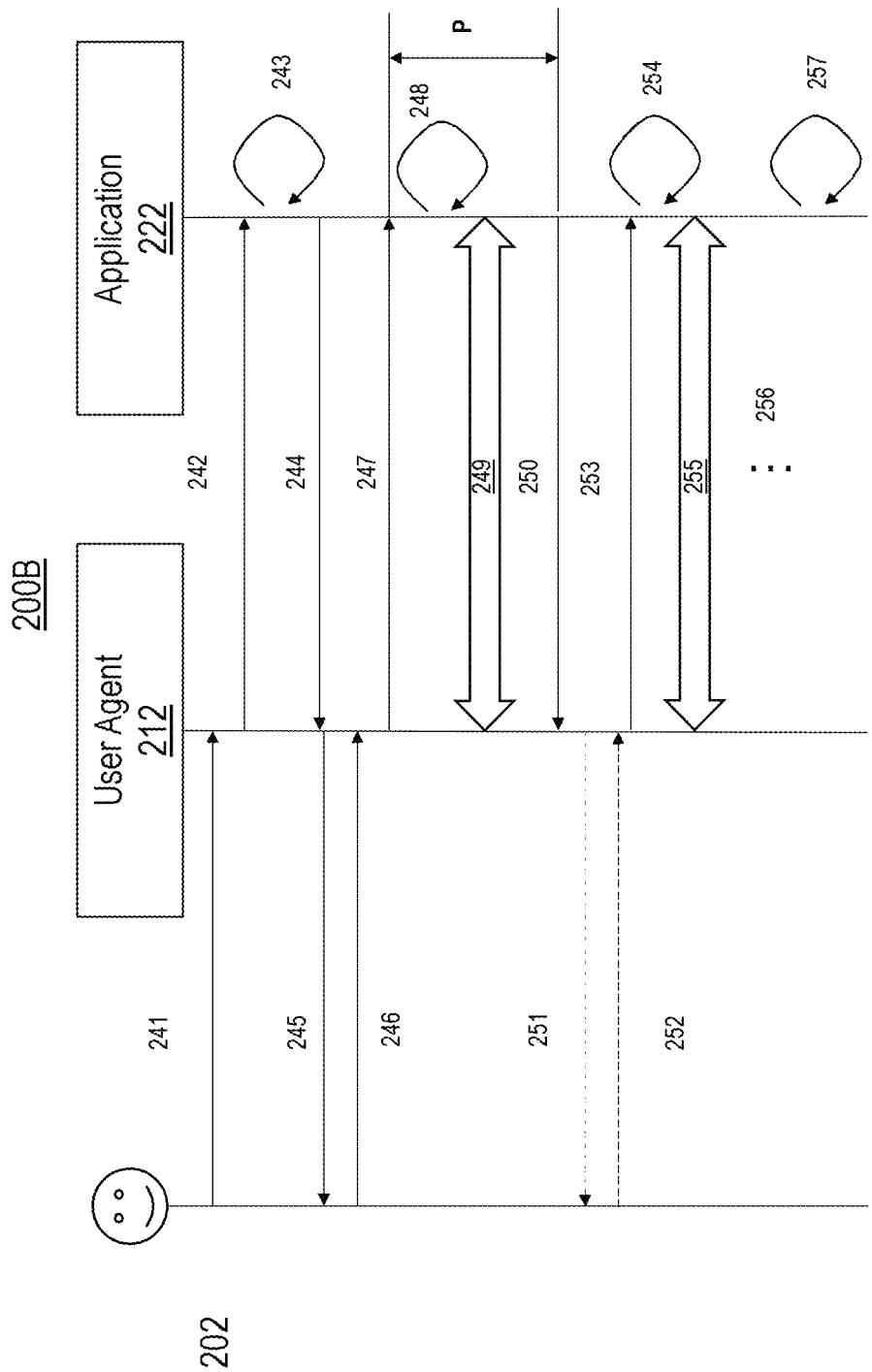
FIG. 2B illustrates an exemplary communication pattern that may occur in the location-aware authentication system of FIG. 2A.

FIG. 2B illustrates an exemplary communication pattern 200 between the user agent 212 and the application 222 of the location-aware authentication/authorization system 200A. Initially, the user 202 may be presented a login interface at the user agent 212. The user 202 interacts with the user agent 212 to input their identifier and credential(s) of a user account at the user agent 212 (represented by arrow 241). In some cases, a geofence is associated with the application 222. In such a case, geolocation data is required as one of the credentials for user's login. In some embodiments, the login user interface may provide a notification or a consent request, requiring the user to consent to the gathering of the geolocation data.

The user agent 212 passes the received identifier and credential(s) (sometimes including geolocation data) to the application 222 (represented by arrow 242). Receiving the user's input of the identifier and credential(s), the application 222 (e.g., the authenticator 224 of the application 222) verifies the user's input with the data registered or maintained in the user's profile to authenticate the user 202 (represented by arrow 243). In some cases, a geofence is associated with certain user accounts. In such a case, the application 222 also determines whether the user account is associated with a geofence. If the user account is associated with a geofence, the application may then request the device's geolocation data from the user agent 212 (represented by arrow 244). Receiving the geolocation data request, the user agent 212 generates a consent notification (represented by arrow 245), asking the user 202 to consent to the gathering of the geolocation data. When the user consents to the gathering of the geolocation data (represented by arrow 246), the user agent then gathers and sends the geolocation data to the application (represented by arrow 247). Receiving the geolocation data, the application 222 then verifies whether the user is within the geofence (represented by arrow 248). If the user's geolocation is within the geofence, the user is authenticated, and a session is established (represented by the arrow band 249).

As discussed with respect to FIG. 2A, in addition to logging in, the application may also enforce various access policies. In some embodiments, the access policies may also include a geofence. A similar communication pattern represented by arrows 244-249 may also be used to represent an access policy enforcement process. When a geofence is part of the access policies associated with the data the user requests to access, the application 222 further requests the user agent 212 to obtain the user device's current geolocation (represented by arrow 244). Receiving the geolocation request, the user agent 212 may generate a consent notification (represented by arrow 245). The user may interact with the consent notification to consent to the request or deny the request (represented by arrow 246). If the user consent to the geolocation request, the user agent 212 acquires the user device's current geolocation data and sends the acquired geolocation data to the application 222 (represented by arrow 247). Receiving the geolocation data, the application 222 determines whether the geolocation data indicates that the user's device 210 is within the geofence (represented by arrow 248). If the user is within the geofence, a session is established (represented by the arrow band 249).

In some embodiments, the session may have a predetermined timeout period P (e.g., one hour). When the predetermined timeout period passes, the application 222 requests the user agent 212 to acquire and send the current geolocation data again (represented by arrow 250). In some embodiments, the user agent 212 may generate a consent notification again to require the user to consent to the geolocation request again (represented by a dotted arrows 251, 252) before acquiring and sending the updated geolocation data to the application 222 again (represented by arrow 253). In some embodiments, the user agent 212 only requires the user's consent in the initial session of the user login; and in the subsequent sessions, the user agent 212 automatically acquires and sends (represented by arrow 253) the current geolocation data without requiring user's repeated consent. Receiving the updated geolocation data, the application 222 again verifies whether the user's device 210 is still within the geofence (represented by arrow 254). If the user's device 210 is still within the geofence, a new session starts or the previous session is renewed (represented by arrow band 255). This process repeats (represented by the ellipsis 256) until the user 202 logs out or the last session times out. When the user 202 logs out or the last session times out, the application terminates the user agent 212's access to the application 222 (represented by 257).

Figure 3A:
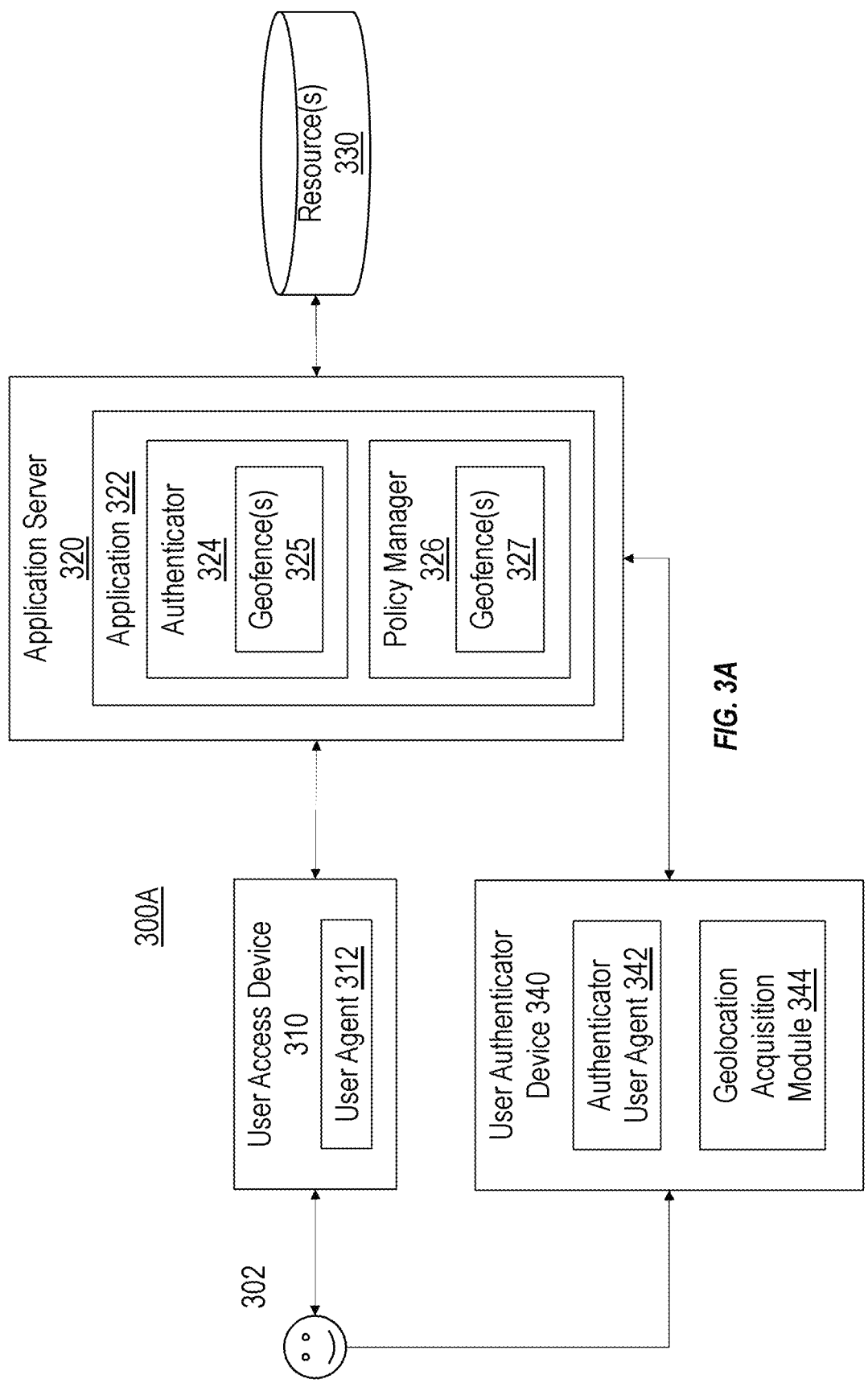
FIG. 3A illustrates an exemplary location-aware authentication system that incorporates the principles described herein.

FIG. 3A illustrates another exemplary location-aware authorization/authentication system 300A, which includes a dedicated user authenticator device 340 to provide geolocation data. Referring to FIG. 3A, the system 300A includes a user access device 310, a user authenticator device 340, an application server 320, and a resource(s) storage 330. The user access device 310 has a user agent 312 (e.g., a browser or a native application), which is used by the user 302 to access application 322 hosted at the application server 320. The application server 320 (similar to the application server 220 of FIG. 2A) hosts an application 322. The application 322 also includes an authenticator 324 and a policy manager 324, each of which may include one or more geofence restrictions 325, 327. In particular, the authenticator 324 is configured to verify user's identifier and credential(s) based on data registered with the user profile. The policy manager 324 is configured to enforce various access policies previously set up for each account, including one or more geofence(s) 325.

However, unlike the system 200A of FIG. 2A, system 300A is further configured to enable multi-factor authentication. In particular, in some embodiments, the multi-factor authentication requires the user 302 to designate an authenticator device 340 for providing geolocation data. The authenticator device 340 may be the user 302's mobile phone, or a company-issued mobile device that is likely to be with the user most of the time. The authenticator device 340 has an authenticator user agent 342 (e.g., an authenticator mobile app) and a geolocation acquisition module 344 (similar to the geolocation acquisition module 214 of FIG. 2A).

When the user 302 logs into the application 322 via the user agent 312 of the user access device 310, the authenticator 324 of the application 322 verifies the identity of the user based on the user's input of identifier and credential(s). At the same time, the authenticator 324 may also require a second verification via the authenticator user agent 342 at the user authenticator device 340. In some embodiments, the user authenticator user agent 344 may generate a notification to ask the user to confirm whether the user is trying to login to the application 322 via the user access device 310. In some embodiments, the user authenticator user agent 344 may generate a time-sensitive one-time code to ask the user to enter at the user agent 312 of the user access device 310 to further confirm the user's identity. Depending on the user account setup, in some cases, the authenticator user agent 344 may also be requested to gather the user authenticator device 340's geolocation data. When the authenticator 324 receives the geolocation data of the user authenticator device 340, the authenticator 324 determines whether the user authenticator device 340 is within the geofence. If the user authenticator device 340 is within the geofence, the authenticator 324 grants the user's login request; otherwise, the authenticator 324 denies the user's login request.

Additionally, when certain access policies are associated with a geofence, and the user 302 requests to access the data associated with such an access policy, the policy manager 324 may also notify the authenticator user agent 342 to obtain and send geolocation data of the user authenticator device 340 from the geolocation acquisition module 344. When the policy manager 324 receives the geolocation data of the user authenticator device 340, the policy manager 324 determines whether the user authenticator device 340 is within the geofence. If the user authenticator device 340 is within the geofence, the user is allowed to log in or access the requested data via the user agent 312; otherwise, the user login or access request is denied.

As an example, the user access device 310 may be the user's laptop, and the user authenticator device 340 may be the user's mobile phone. The application 322 may be a bank's web application. The user agent 312 at the user's laptop 310 may be a web browser. The authenticator user agent 342 may be an authenticator mobile app installed at the user's mobile phone. When the user 302 uses their laptop to access the bank's web application 322, a login web page is first displayed at the web browser 312, and the user 302 enters their username and password at the login web page, which is sent to the application server 320. Receiving the user-entered username and password, the authenticator 324 of the application compares the received username and password with the data registered in the user account's profile. At the same time, the authenticator 324 may also determine whether the user account is associated with a geofence. If the user account is associated with a geofence, the authenticator 324 may further send the user's authenticator mobile app 342 a notification, requesting for geolocation data of the mobile phone 340. As briefly discussed above, since the user's geolocation data concerns the user's privacy, the authenticator mobile app 342 may first ask the user to consent to the gathering of the device's geolocation data. Only after a user's consent is received, the authenticator mobile app 342 would cause the geolocation acquisition module 344 to gather the mobile phone 340's current geolocation data and send the gathered geolocation data to the authenticator 324 of the application 322.

Similar to the authenticator 224 and policy manager 226, in some embodiments, the application 322 may require verification of every user account. In some embodiments, the application 322 may not require the verification of the user's location, but the policy manager 326 enforces certain access policies that require the verification of the user's location. In such a case, the user's location is not required during the general login event. Only when the user requests for access to certain data that is associated with a geofence, the user's location is required.

Note, in general, the user access device 310 and the user authenticator device 340 are different devices, and only the user authenticator device 340 is a designated device that is registered with the application 322 and required to gather user 302's geolocation data. In some cases, the user may use the designated device 340 to access the application 322. In such a case, the user access device 310 and the user authenticator device 340 would be the same device.

Further, in some cases, the user account is associated with more than one device, and only one of the devices is designated as a primary device. In such a case, the primary device may be used as the authenticator device 340. In some cases, the user may not designate any one of the multiple devices as a primary device. In such a case, each of the multiple devices associated with the user may receive a geolocation data request or a consent request.

Figure 3B:
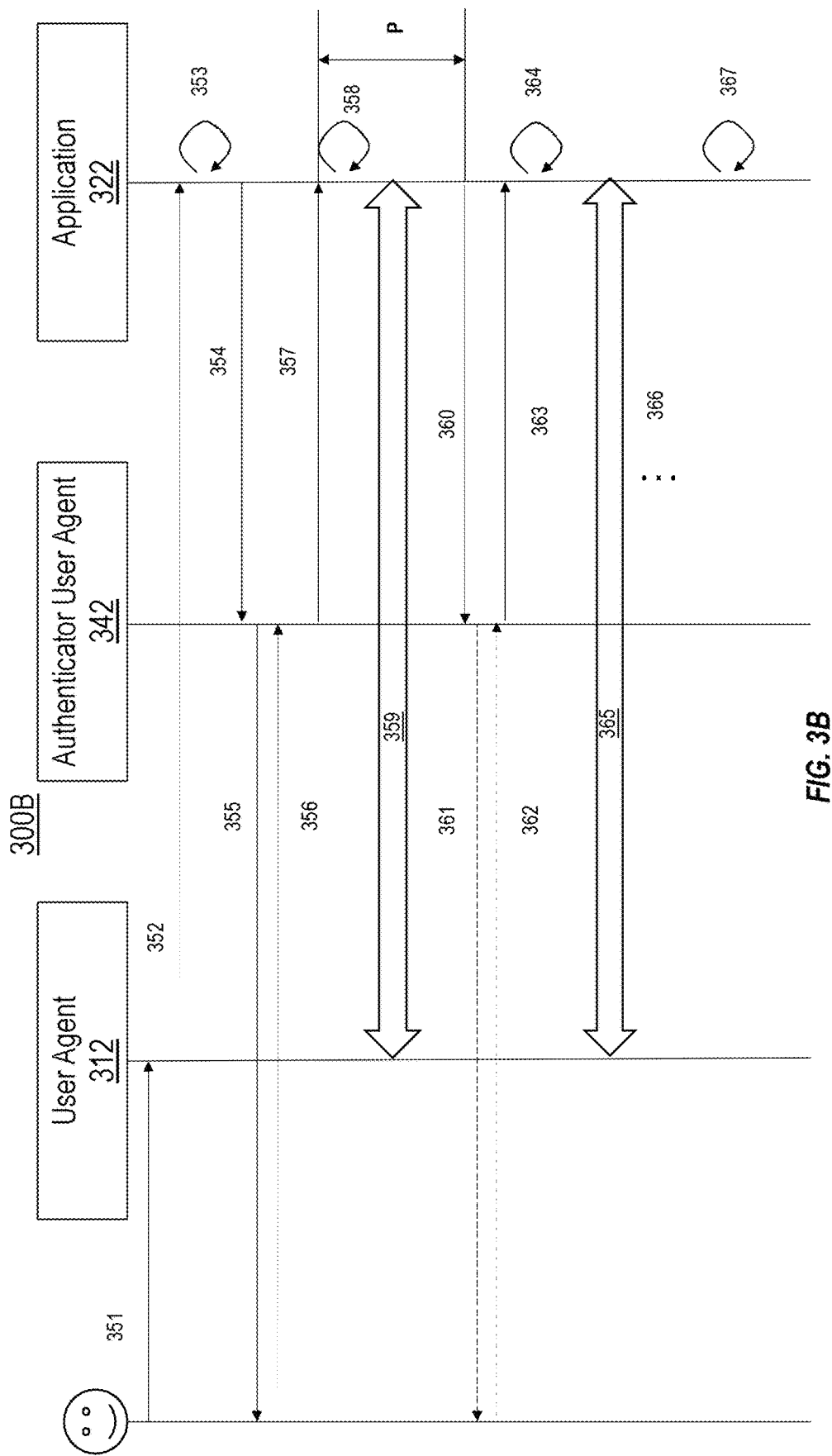
FIG. 3B illustrates an exemplary communication pattern that may occur in the location-aware authentication system of FIG. 3A.

FIG. 3B illustrates an exemplary communication pattern that occurs amongst the user agent 312, the authenticator user agent 342, and the application 322. The user agent 312 presents the user with a login interface, and the user enters their identifier and credential(s) at the user agent 312 (represented by arrow 351). The user agent 312 then passes the entered identifier and credential(s) to the application 322 (represented by arrow 352). The application 322 (e.g., the authenticator 324 of the application 322) verifies the received identifier and credentials with the data registered with the user's profile (represented by arrow 353). At the same time, the application 322 also determines whether the user account requires multi-factor authentication. If the user account requires multi-factor authentication, the application 322 further notifies the authenticator user agent 342 to obtain additional verification (represented by arrow 354). In some embodiments, the additional verification requests the authenticator user agent 342 to gather geolocation data. Receiving the geolocation data request, the authenticator user agent 342 generates a consent notification to the user 302 (represented by arrow 355). When the user 302 consents to the geolocation request (represented by arrow 356), the authenticator user agent 342 gathers and sends the geolocation data to the application (represented by arrow 357). Receiving the geolocation data, the application 322 verifies whether the user is within a required geofence (represented by arrow 358). If the user is within the required geofence, the user's login request or access request is granted, and a session is established (represented by arrow band 359).

Similar to the session 249 of FIG. 2B, the session 358 may also have a timeout period P (e.g., one hour). When the timeout period passes, the application 322 generates a new request to the authenticator user agent 342 to request for updated geolocation data (represented by arrow 360). Also similar to the geolocation update request in FIG. 2B, in some embodiments, a second user consent is required (represented by dotted arrows 361, 362) before the authenticator user agent 342 acquires and sends the user's geolocation data again (represented by arrow 363). In some embodiments, the user consent is only required at the login or a first session of each login, and the subsequent sessions are automatically renewed. As such, the authenticator user agent 342 automatically sends the user's current geolocation data to the application 322 without additional user consent. Again, the application 322 reverifies the user's geolocation (represented by arrow 364). Once the user's geolocation is reverified, a new session is established or the previous session is renewed (represented by arrow band 365). This process repeats (represented by ellipsis 366) until the user logs out or the session expires, and the application 322 terminates the final session (represented by arrow 367).

Again, in some embodiments, when the user 302 requests for access to a portion of data that is associated with a geofence restriction, the policy manager 326 enforces the geofence restriction similar to the authenticator 324, and a similar communication patterns occurs, which will not be further discussed. Also, as described with respect to FIG. 3A, the geofence restrictions 325 associated with the user account and the geofence restrictions 327 associated with access policy are not necessarily mutually exclusive. In some cases, the geofence is only implemented with the user account. In some cases, the geofence is only implemented with the access policies. In yet some cases, different geofences are implemented with the user account and with different access policies.

In the above-described systems 200A and 300A, the identity management functions (e.g., the functions of authenticator 224, 324, and the policy manager 226, 326) are implemented at the application 222, 322. The similar principles described above may also be implemented at an identity server, which provides identity management, authorization, and/or authentication services to other applications and/or APIs. FIGS. 4A-5B illustrate additional exemplary location-aware authentication systems 400A, 500A, in which the identity management functions (including authentication and authorization) are provided by an identity server 440, 540.

Figure 4A:
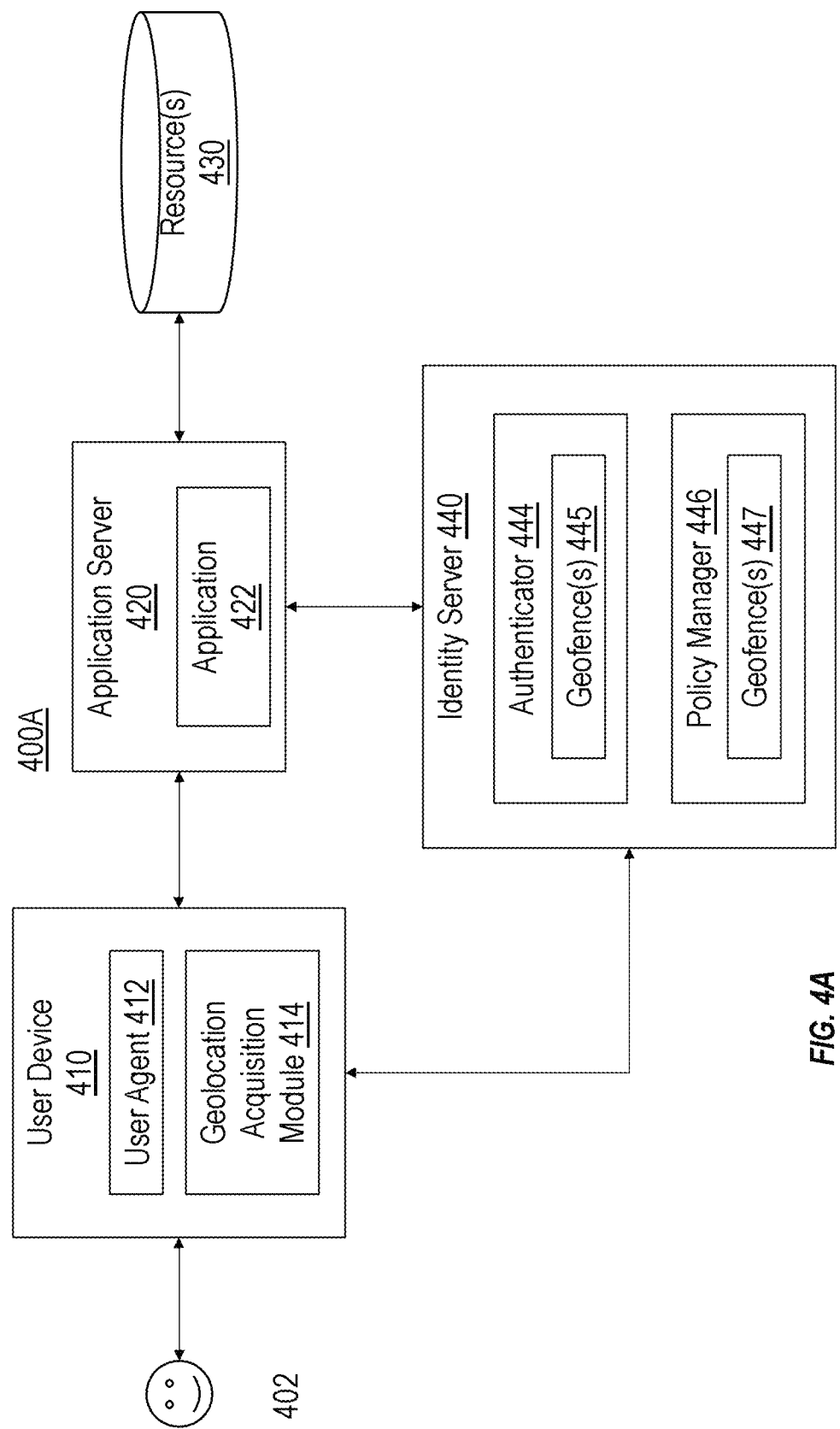
FIG. 4A illustrates an exemplary location-aware authentication system that incorporates the principles described herein.

FIG. 4A illustrates an exemplary location-aware authentication system 400A includes a user device 410, an application server 420, a resource(s) storage 430, and an authentication server 440. The user device 410 generally corresponds to the user device 210 of FIG. 2A, having a user agent 412 and a geolocation acquisition module 414. The application server 420 hosts an application 422 that has access to the resource(s) storage 430. However, unlike the application 222, the application 422 uses the identity server 440 for identity management. The identity server 440 includes an authenticator 444 and a policy manager 446. The authenticator 444 is configured to authenticate a user based on user-entered identifier and one or more credential(s). In some embodiments, depending on the account setup, certain accounts may be associated with geofence(s) 445, which is enforced by the authenticator 444 at the time the user is authenticated (e.g., at the time the user logs in). The policy manager 446 is configured to manage one or more access policies. In some embodiments, some of the access policies may also be associated with geofence(s) 427, which is enforced by the policy manager 336 when the user 402 requests for certain data associated with a geofence 337.

Various authentication protocols may be implemented at the identity server 440. In some embodiments, when a user 402 tries to access the application 422 via the user agent 412 at the user device 410, the user agent 412 may be redirected to a login interface provided by the identity server 440, through which the user 402 enters their identifier and one or more credential(s). Receiving the entered identifier and the one or more credential(s), the authenticator 424 of the identity server 422 verifies the entered identifier and credential(s) with the data registered with the user account profile.

When the user account is associated with a geofence, the authenticator 424 may further cause the geolocation acquisition module 414 of the user device 410 to gather and send the user device 410's current geolocation data to the identity server 440. In some embodiments, before the geolocation data is gathered, the user 402 may be notified via the user login interface. Alternatively, or in addition, the user agent 412 generates a consent notification, requiring the user 402 to consent to the gathering of the geolocation data. In embodiments, only when the user's consent is received, the geolocation data is gathered and sent. Receiving the geolocation data from the user agent 412, the authenticator 444 verifies whether the user is within the required geofence 445. The verification/authentication result is then stored in a data structure (e.g., a token), and the data structure is then sent to the application 422 directly or indirectly through the user agent 412.

In some embodiments, the authenticator 444 only generates a binary indicator, indicating whether the user's device 410 is within the required geofence or not. The binary indicator is stored in the data structure as a binary field and sent to the application 422. After the determination, the geolocation data is deleted for protecting user's privacy. If the user is within the required geofence 445, the application 422 grants the user's login request; otherwise, the application 422 rejects the user's login request.

Alternatively, or in addition, the application 420 may also use the policy manager 446 to manage one or more access policies, which also includes one or more geofence(s) 447. After the user has been logged in, the user may request to access a particular portion of data that is associated with an access policy, which may include a geofence. Similar to the login request, the access request may also be redirected to the identity server 440. Receiving the access request, the policy manager 446 retrieves the access policy associated with the particular portion of data. If the access policy includes a geofence 446, the policy manager 446 further requests the geolocation acquisition module 414 of the user device 410 to obtain and send the device 410's current geolocation data. Similarly, before the geolocation data is gathered and sent, the user agent 412 may also be caused to generate a consent notification, requiring the user 402 to consent to the gathering of the geolocation data. Only when the user's consent is received, the geolocation data is gathered and sent to the policy manager 446. Receiving the geolocation data, the policy manager 446 may then verifies whether the user's device 402 is within the required geofence 447. Similar to the authenticator 444, the policy manager 446 may also store the verification result in a data structure and sends the data structure to the application 422 directly or indirectly through the user agent 412. The application 422 then grants or denies the user's access request based on the received verification result.

In some other embodiments, the user agent 412 may not be redirected to interfaces of the identity server 440. Instead, the application 422 gathers the user-entered identifier and credential(s) and/or access request and forwards the gathered data and request to the identity server 440. The authenticator 444 and the policy manager 446 verifies the data received from the application 422 with the data registered with the user's profile and/or the access policies, and send the verification result to the application 422 directly or indirectly, causing the application 422 to grant or deny the user's login request and/or data access request.

FIG. 4B illustrates an exemplary communication pattern 400B that occurs amongst the user agent 412, the application 422, and the identity server 440. As illustrated, the user 402 attempts to access the application via the user agent 412. The user 402 enters an identifier and one or more credential(s) at the user agent 412 (represented by arrow 451). The user entered identifier and credential(s) are then sent to the authentication server directly or indirectly via the application 422 (represented by dotted arrow 452). The authentication server 440 verifies the user-entered identifier and credential(s) with data registered with the user's profile (represented by arrow 453). At the same time, the authentication server 440 also determines whether the user account is associated with a geofence. If the user account is associated with a geofence, the authentication server 440 further sends a geolocation data request to the user agent 412 (represented by arrow 454). Receiving the geolocation data request, the user agent 412 generates a consent notification to the user 402 (represented by arrow 455). After the user consents to the gathering of the geolocation data (represented by arrow 456), the user agent 412 gathers the geolocation data of the user device 410 and sends the gathered geolocation data to the authentication server 440 (represented by arrow 457).

Receiving the geolocation data, the authentication server 440 verifies whether the user is within the required geofence (represented by arrow 458). In some embodiments, the verification result is stored in a data structure and sent to the application 422 directly or indirectly via the user agent 412 (represented by dotted 459). Receiving the verification result, the application 422 grants or denies the user's login request (represented by arrow 460). When the application 422 grants the user's login request, a session is established (represented by arrow band 461). The session 461 may have a timeout period P (e.g., one hour). When the timeout period passes, the authentication server 440 sends a new geolocation data request to the user agent 412 again (represented by arrow 462). In some embodiments, the user 402 is required to consent to the gathering of the geolocation data again (represented by dotted arrows 463, 464). After the user 402's new consent, the user agent 412 gathers and sends the updated geolocation data to the authentication server 440 directly or indirectly (represented by dotted arrow 465). In some embodiments, the user 402 is only required to consent to the first request at the login event, and the re-verification of the user's geolocation data in the subsequent sessions is automatically performed. Receiving the updated geolocation data, the authentication server 440 verifies whether the user 402 is still within the geofence again (represented by arrow 466). The verification result is then stored in a data structure and sent to the application 422 directly or indirectly through the user agent 412 (represented by dotted arrow 467). Receiving the verification result, the application 422 determines whether a new session is to be established or the previous session is to be renewed (represented by arrow 468). The arrow band 469 represents that a new session is established. This process repeats (represented by the ellipsis 470) until the user logs out, or the last session expires (represented by arrow 471).

Again, in some embodiments, when the user 402 requests for access to a portion of data that is associated with a geofence restriction, the policy manager 446 enforces the geofence restriction similarly as the authenticator 444, and similar communication patterns as illustrated in FIG. 4B occur, which will not be further discussed. Also, as described with respect to FIG. 4A, the geofence restrictions 445 associated with the user account and the geofence restrictions 447 associated with access policy are not necessarily mutually exclusive. In some cases, the geofence is only implemented with the user account. In some cases, the geofence is only implemented with the access policies. In yet some cases, different geofences are implemented with the user account and with different access policies.

Figure 5A:
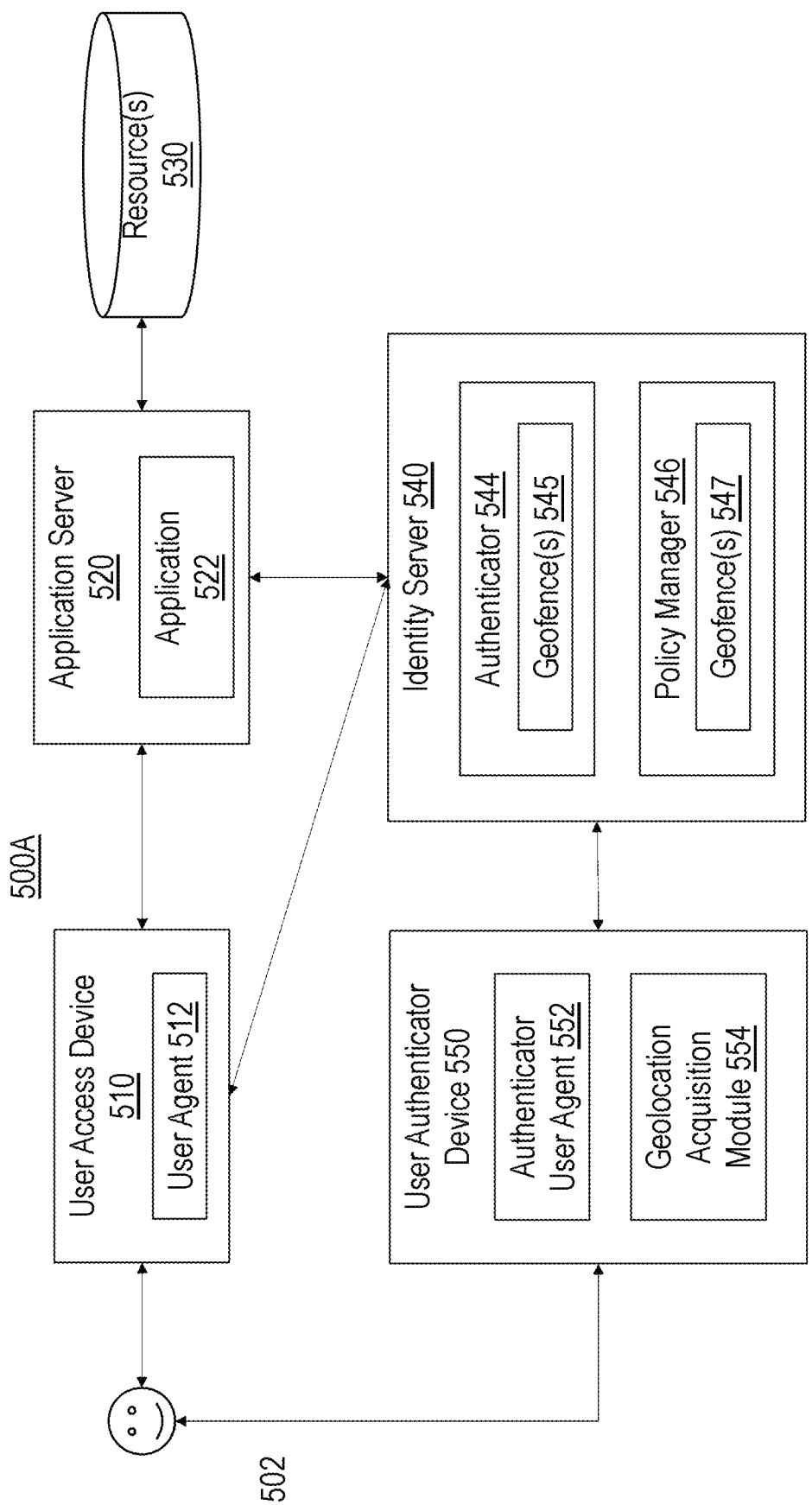
FIG. 5A illustrates an exemplary location-aware authentication system incorporates the principles described herein.

FIG. 5A illustrates another exemplary location-aware authentication system 500A that requires verification of geolocation data of a designated user authenticator device 540. Referring to FIG. 5A, the system 500A includes a user access device 510, an application server 520, a resource(s) storage 530, a user authenticator device 540, and an identity server 540. The user access device 510 is similar to the user access device 310 of FIG. 3A that has a user agent 512 (e.g., a browser) that allows a user 502 to access an application 522 hosted at the application server 520. The application 522 has access to the resource storage 530. The application 522 uses the identity server 540 for identity management. The identity server 540 includes an authenticator 544 and a policy manager 546, each of which includes one or more geofences 545, 547. In particular, the authenticator 544 is configured to verify the user's identifier and credential(s) based on data registered with the user profile. The policy manager 546 is configured to enforce various access polices previously set up for each user account, including one or more geofences(s) 547.

However, unlike the identity server 440 of FIG. 4A, the identity server 540 is further configured to enable multi-factor authentication. In particular, in some embodiments, the multi-factor authentication requires the user 502 to designate an authenticator device 540 for providing geolocation data. The authenticator device 540 may be the user 502's mobile phone, or a company-issued mobile device that is likely to be with the user most of the time. The authenticator device 540 has an authenticator user agent 542 (e.g., an authenticator mobile app) and a geolocation acquisition module 544 (similar to the geolocation acquisition module 344 of FIG. 3A).

In some embodiments, when the user 502 tries to access the application 522 via the user agent 512, the user 502 enters an identifier and/or one or more credential(s) at the user agent 512. The user entered identifier and credential(s) are then sent to the identity service 540 directly or indirectly via the application 522. The authenticator 544 verifies the user-entered identifier and credentials with the registered data associated with the user account profile. In some cases, the user account may be associated with a geofence. In such a case, the authenticator 544 then sends a geolocation request to the authenticator user agent 542 at the user authenticator device 540. Receiving the geolocation request, the authenticator user agent 542 may first generate a consent notification, asking the user 502 to consent to the gathering of the geolocation data. After the user consent is received, the authenticator user agent 542 causes the geolocation acquisition module 544 to gather current geolocation data of the user authenticator device 540. Once the authenticator 544 receives the geolocation data from the authenticator user agent 542, the authenticator 544 verifies whether the user is within the geofence. The verification result is then stored in a data structure and sent to the application server 520 directly or indirectly via the user agent 512, causing the application 522 to grant or deny the user's login request.

In some embodiments, the application 522 also uses the policy manager 546 to enforce one or more access policies, including geofences 547. When the user 502 requests for access a particular portion of data, the request is directly or indirectly sent to the policy manager 546. The policy manager 546 then determines whether one or more policies apply to the particular portion of data. When it is determined that an access policy, including a geofence, is applicable to the particular portion of data, the policy manager 546 then requests geolocation data from the authenticator user agent 542. Similarly, the authentication user agent 542 also generates a consent notification to the user 502. When the user consents to the gathering of the geolocation data, the authenticator user agent 542 causes the geolocation acquisition module 544 to gather current geolocation data of the user authenticator device 540. When the policy manager 546 receives the geolocation data from the authenticator user agent 542, the policy manager 546 verifies whether the user is within the geofence. The verification result is then stored in a data structure and sent to the application 522 directly or indirectly via the user agent 512. When the application 522 receives the verification result, the application 522 grants or rejects the user 502's access request at the user agent 512.

For example, the user 502 may use their laptop as the user access device 510 to enter username and password into a web application 522. The entered username and password are directly or indirectly sent to the identity server 540. The authenticator 544 of the identity server 540 determines whether the user entered data match the data registered with the user account profile. Further, the authenticator 544 also determines whether the user account is associated with a geofence restriction. When the user's account is associated with a geofence restriction, the authenticator 544 sends a geolocation request to an authenticator mobile app at the user's mobile phone (which serves as the user authenticator device 540). After the user 502 consents to the gathering of the geolocation data at their mobile phone, the authenticator mobile app gathers and sends the user's geolocation data to the authenticator 544. The authenticator 544 verifies whether the user is within the geofence or not. The verification result is then packaged in a token and sent to the web application 522 directly or indirectly. The web application 522 then grants or denies the user's login request based on the received token.

Figure 5B:
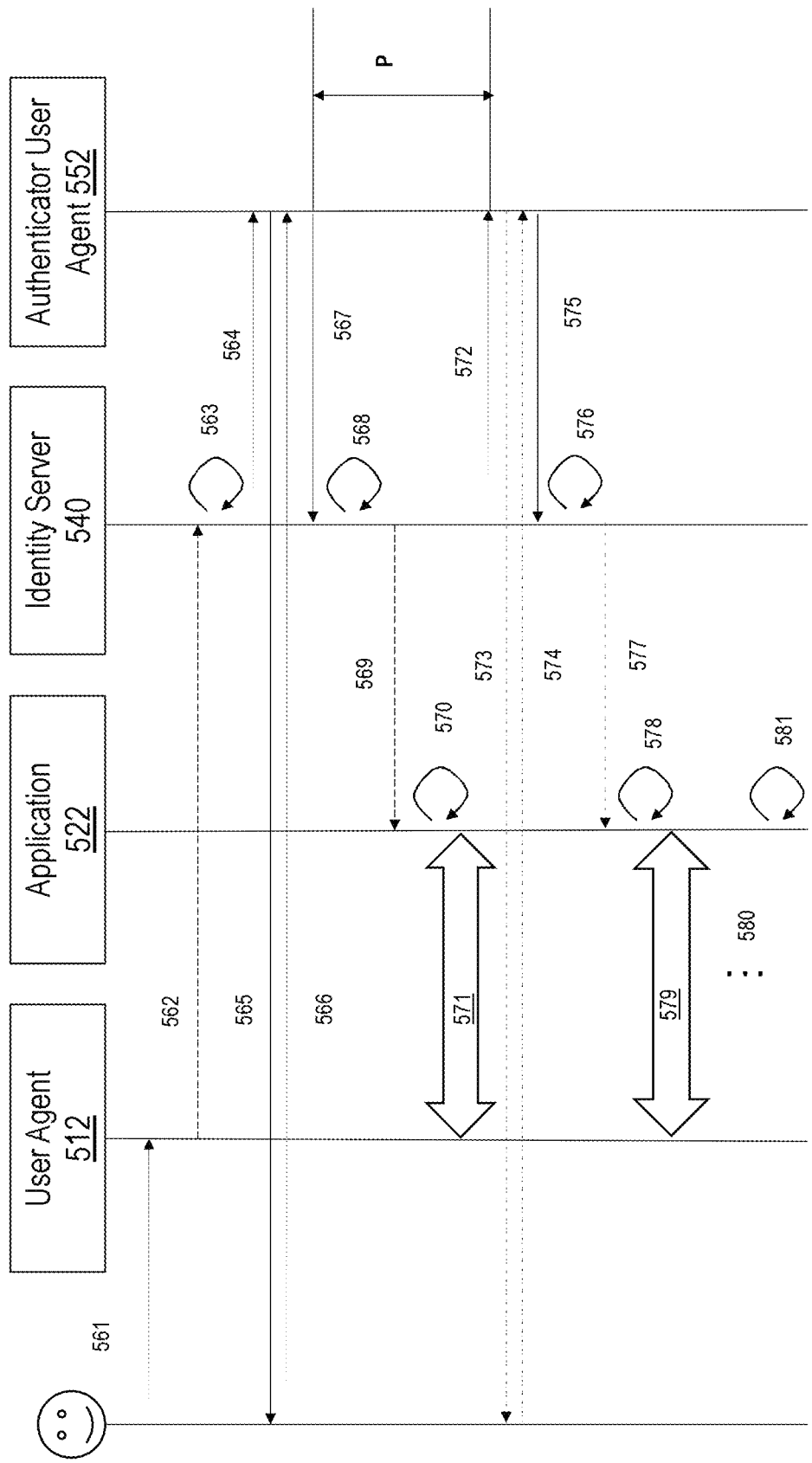
FIG. 5B illustrates an exemplary communication pattern that may occur in the location-aware authentication system of FIG. 5A.

FIG. 5B illustrates an exemplary communication pattern 500B that occurs amongst the user agent 512, the application 522, the authenticator user agent 542 and the identity server 540 of the system 500A. As illustrated, the user 502 initiates access to the application 522 and enters an identifier and one or more credential(s) at the user agent 512 (represented by arrow 561). The entered identifier and credential(s) are sent to the identity server 540 directly or indirectly (represented by dotted arrow 562). The identity server 540 verifies the received identifier and credential(s) with the data registered with the user account profile (represented by arrow 563). At the same time, the identity server 540 also determines whether the user account is associated with a geofence restriction. If the user account is associated with a geofence restriction, the identity server 540 sends a geolocation data request to the authenticator user agent 552 (represented by arrow 564). Receiving the geolocation data request, the authenticator user agent 522 generates a consent notification (represented by arrow 565). Only when the user consent to the gathering of the geolocation data (represented by arrow 566), the authenticator user agent 552 gathers and sends the geolocation data to the identity server 540 (represented by arrow 567). Receiving the geolocation data, the identity server 540 verifies whether the user is within the geofence (represented by arrow 568). The verification result is then stored in a data structure and sent to the application 522 directly or indirectly via the user agent 512 (represented by dotted arrow 569). The application 522 then determines whether the user's login request is to be granted or rejected (represented by arrow 570). If the user's login request is granted, a session is established (represented by arrow band 571).

In some embodiments, the session 571 has a timeout period (e.g., an hour). When the timeout period passes, the identity server 540 sends a new request for geolocation data to the authenticator user agent 552 (represented by arrow 572). In some cases, the user 502 may be required to consent again (represented by arrows 573, 574) before the authenticator user agent 552 gathers and sends updated geolocation data to the identity server 540 again (represented by dotted arrows 575). In some cases, the user 502 is only required to consent at the login or at the first session of data access, and the subsequent sessions are automatically verified and renewed. Receiving the updated geolocation data, the identity server 540 verifies again whether the user is still within the geofence (represented by arrow 576). The verification result is again stored in a data structure and sent to the application 522 directly or indirectly (represented by dotted arrow 577). The application 522 then determines whether a new session is to be established or the previous session is to be renewed based on the received verification result (represented by arrow 578). The arrow band 579 represents that a new session is established. This process repeats (represented by ellipsis 580) until the user logs out or the last session expires. When the user logs out, or the last session expires, the application 522 terminates the user access to the application (represented by arrow 581).

Again, in some embodiments, when the user 502 requests for access to a portion of data that is associated with a geofence restriction, the policy manager 546 enforces the geofence restriction similarly as the authenticator 544, and similar communication patterns as illustrated in FIG. 5B occur, which will not be further discussed. Also, as described with respect to FIG. 5A, the geofence associated with the user account, and the geofence associated with access policy are not necessarily mutually exclusive. In some cases, the geofence is only implemented with the user account. In some cases, the geofence is only implemented with the access policies. In yet some cases, different geofences are implemented with the user account and with different access policies.

Figure 6B:
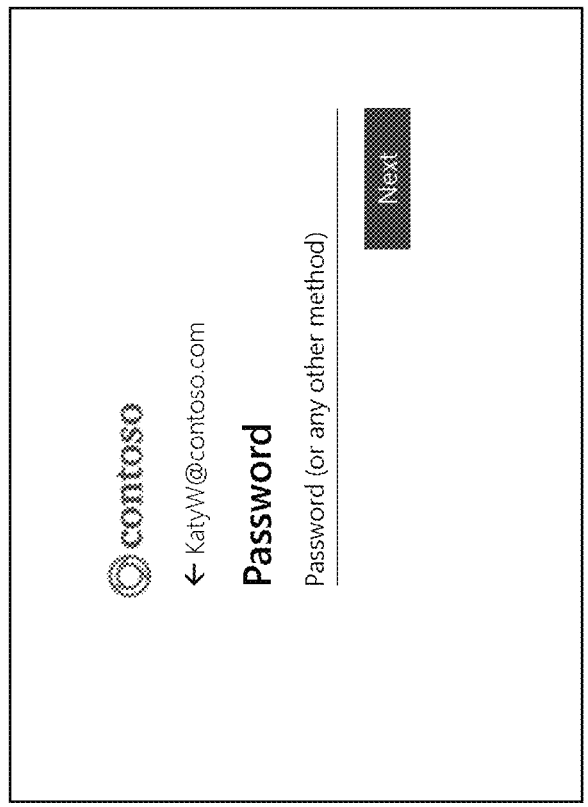
FIGS. 6A-6C illustrate various exemplary user interfaces for logging into a web application.
Figure 6A:
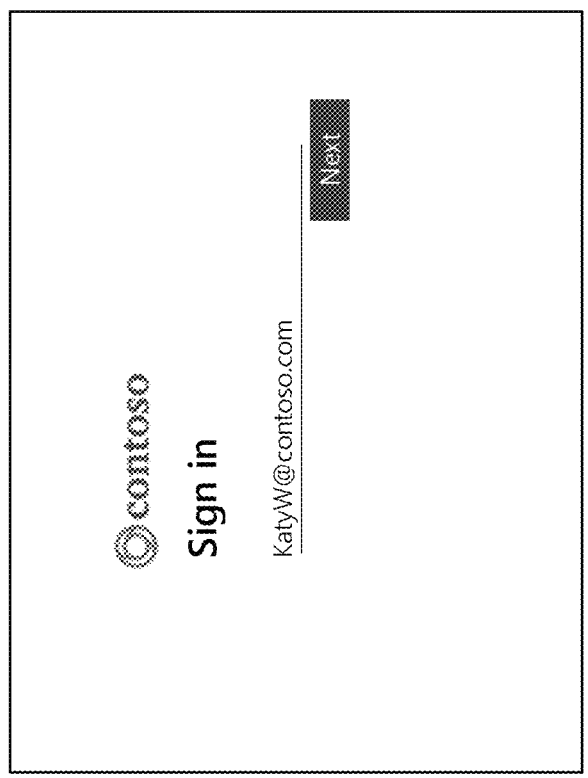
Figure 6C:
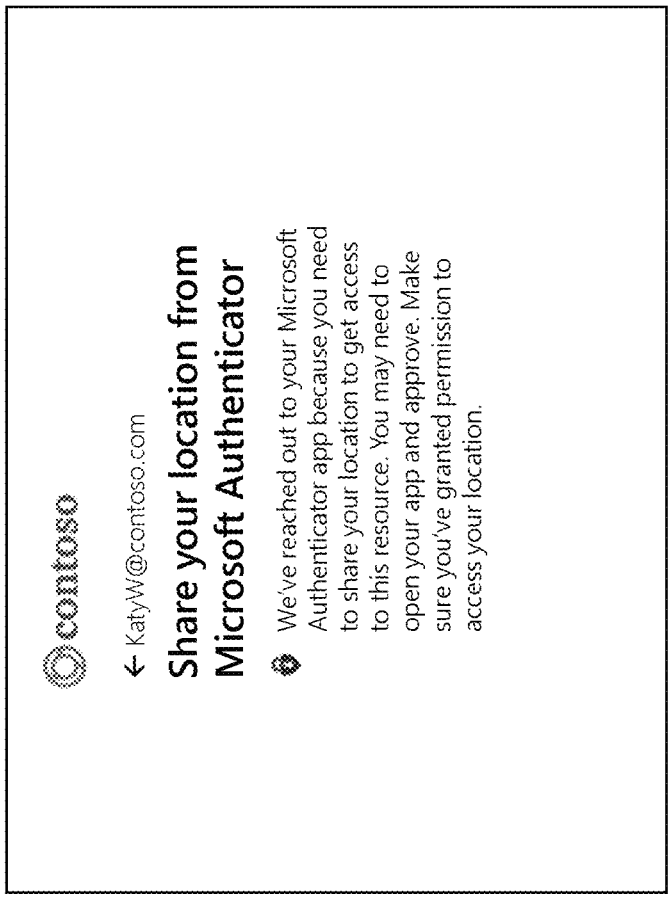

FIGS. 6A-13C further illustrate various exemplary user interfaces that may be displayed at the user access device 210, 310, 410, 510 and/or user authenticator device 340, 550. FIG. 6A-6B illustrates exemplary user login interfaces that may be displayed at the user access device 210, 310, 410, 510, which prompts the user to enter an identifier and a password credential. FIG. 6C illustrates an exemplary user interface notifying user that the user's authentication app (which corresponds to the authenticator user agent 342, 552) installed at the user's mobile device (which corresponds to the user authenticator device 340, 550) is notified, after the user enters the identifier and password. FIGS. 7A-7C illustrate various exemplary notifications generated at the user's mobile device (i.e., the user authenticator device 340, 550) requesting the user to allow location access to complete the sign-in request initiated at the user access device illustrated in FIGS. 6A-6C.

Figure 7C:
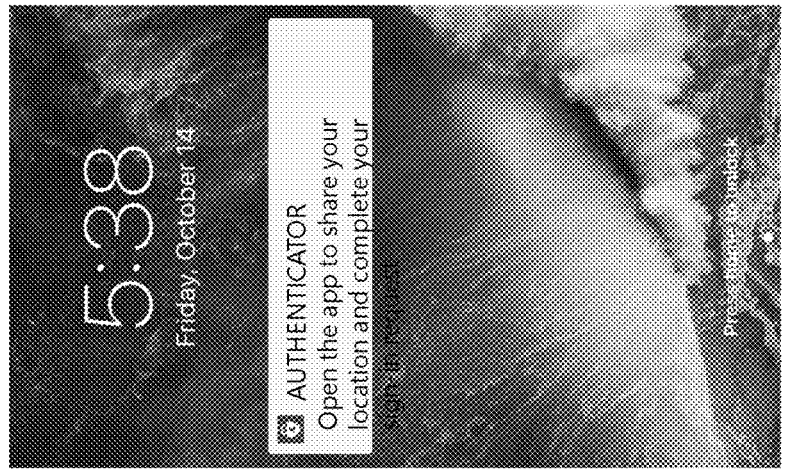
FIGS. 7A-7C illustrate various exemplary user interfaces of a mobile device showing consent notifications requesting a user to consent location sharing.
Figure 7B:
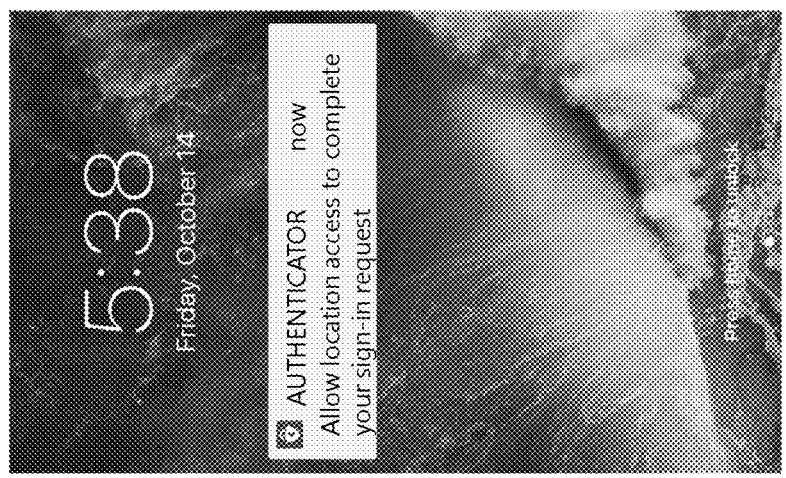
Figure 7A:

FIGS. 7A-7C illustrate various exemplary user interfaces of the user's authentication app (i.e., the authenticator user agent 342, 552). As illustrated in FIG. 7A, the user can use a fingerprint to log in to the authentication app. FIG. 7B illustrates that after the user logs in to the authentication app, different accounts for different applications are listed, and the Contoso account shows an "action required" notification. FIG. 7C illustrates that after the user interacts with the Contoso account's notification, a pop-up notification is generated, asking the user whether the GPS location can be shared.

Figure 8C:
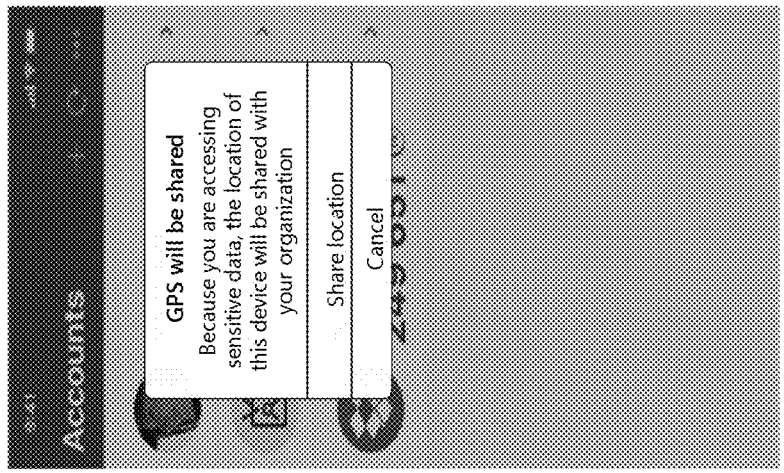
FIGS. 8A-8I illustrate various exemplary user interfaces of a mobile authentication app that allows users to manage different accounts for accessing different applications.
Figure 8B:
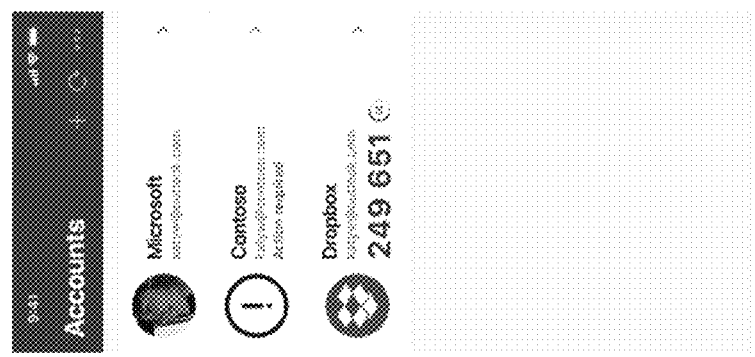
Figure 8A:
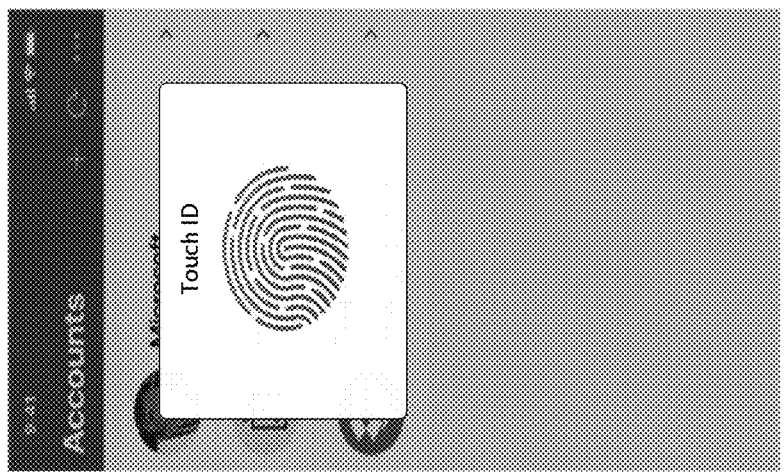
Figure 8F:
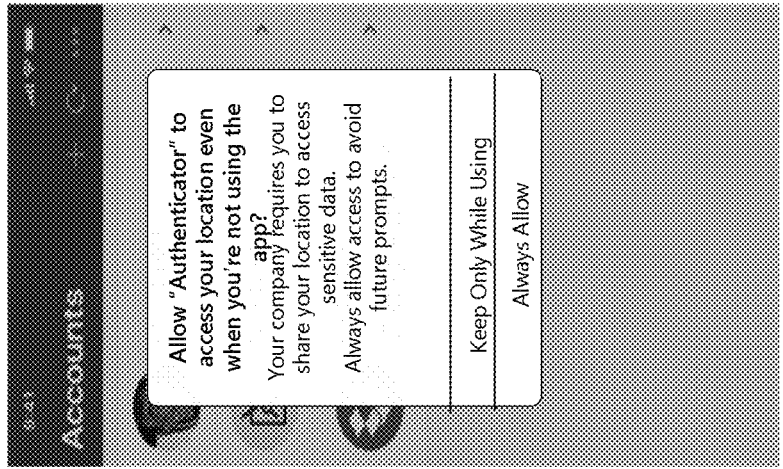
Figure 8E:
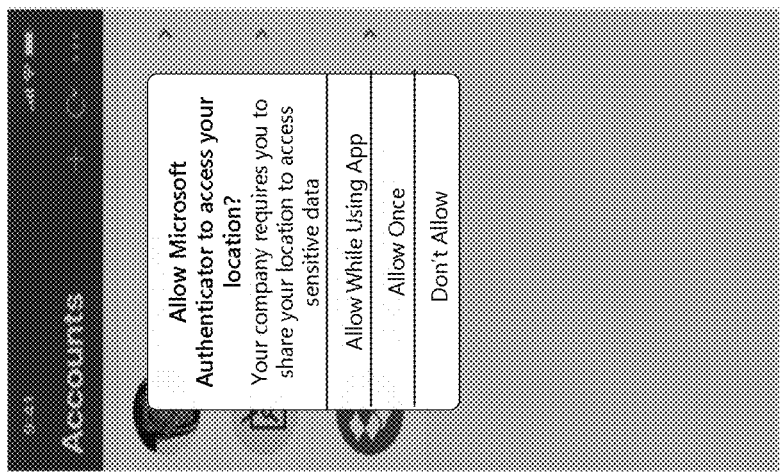
Figure 8D:
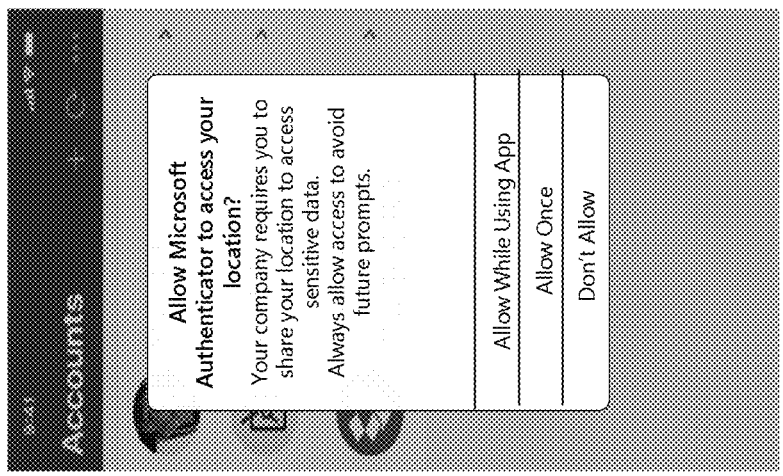
Figure 8I:
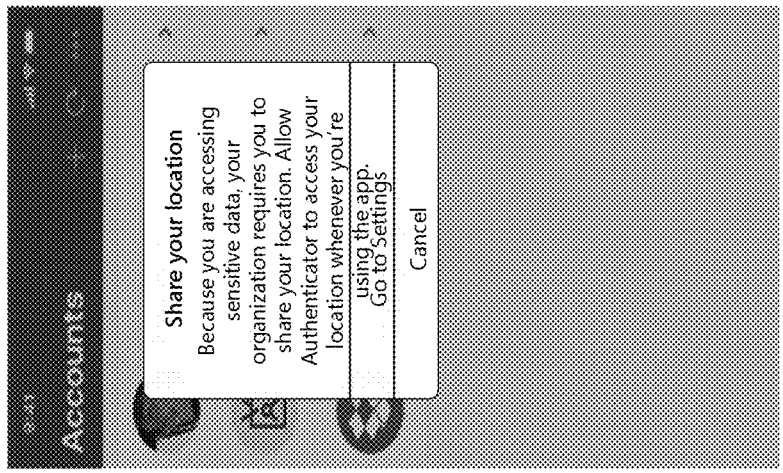
Figure 8H:
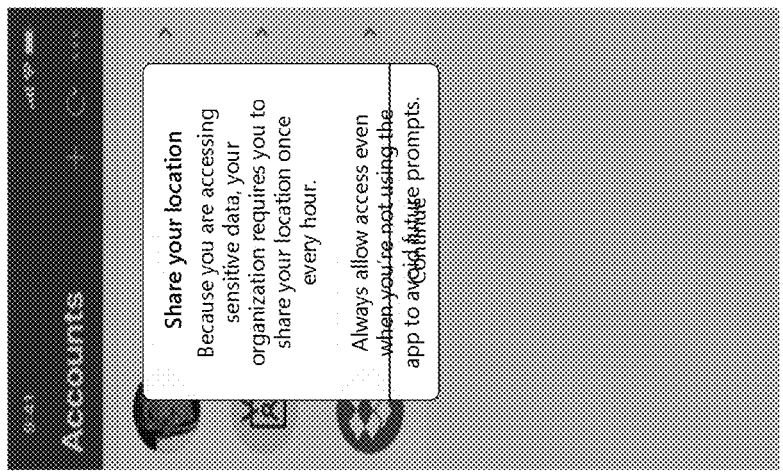
Figure 8G:
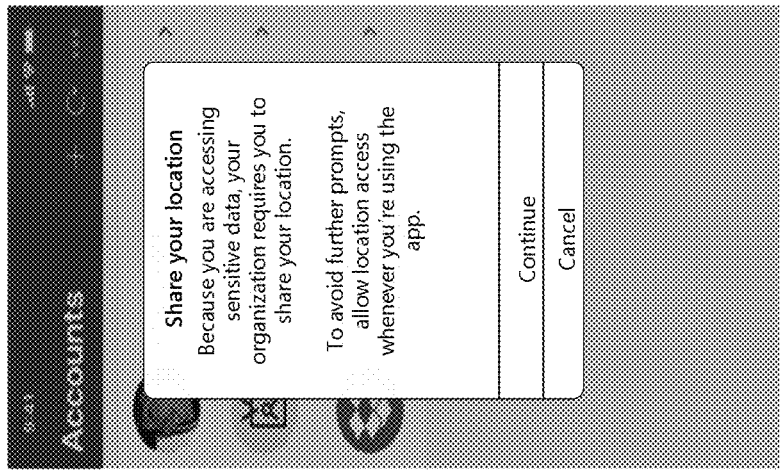

FIGS. 8A-8C illustrate various exemplary user interfaces of the user's authentication app (i.e., the authenticator user agent 342, 552). As illustrated in FIG. 8A, the user can use a fingerprint to log in to the authentication app. FIG. 8B illustrates that after the user logs in to the authentication app, different accounts for different applications are listed, and the Contoso account shows an "action required" notification. FIG. 8C illustrates that after the user interacts with the Contoso account's notification, a pop-up notification is generated, asking the user whether the GPS location can be shared.

FIGS. 8D-8I illustrate additional exemplary user interfaces of the user's authentication app having different pop-up notifications requesting the user to consent to location sharing. In particular, the notifications shown in FIGS. 8D-8I indicate that the user's company requires the user to share the location data only if the user needs to access sensitive data.

Figure 9C:
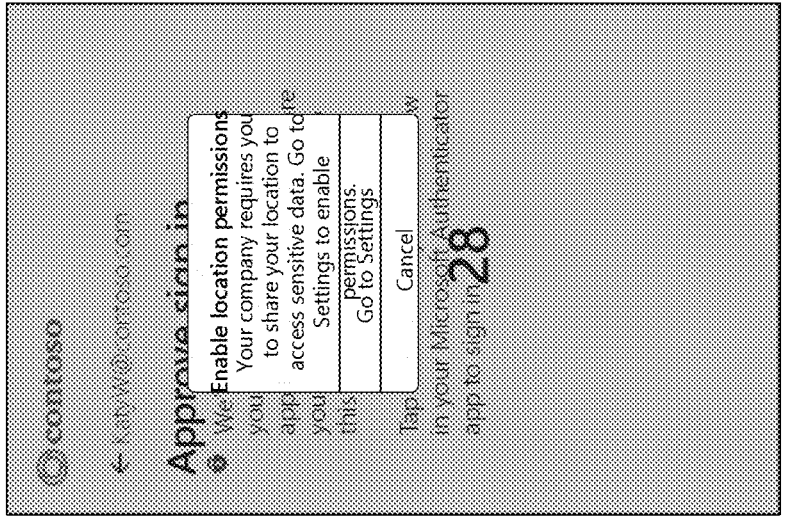
FIGS. 9A-9C illustrate various exemplary user interfaces of a custom mobile authentication app that allows user to manage a particular account for accessing a particular application.
Figure 9B:
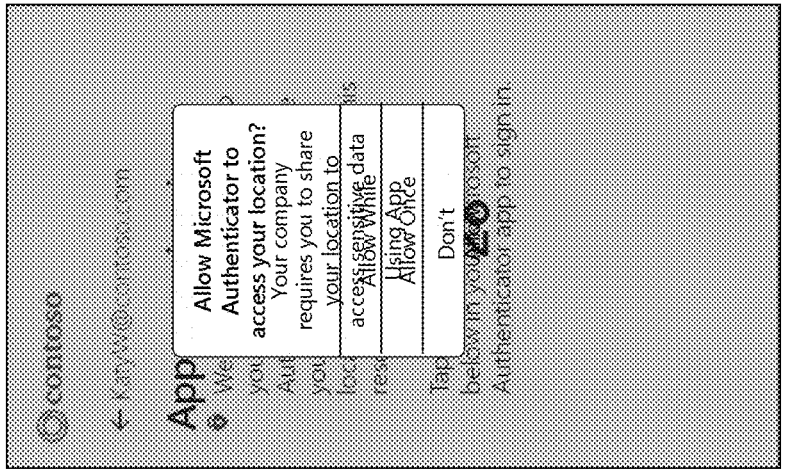
Figure 9A:
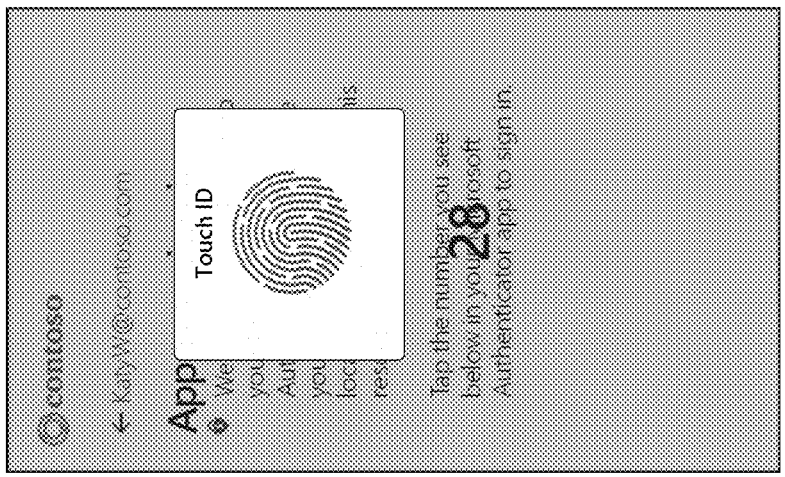

FIGS. 9A-9C further illustrate various exemplary user interface of Contoso's authentication app, which may be custom built by or for Contoso's web application.

Figure 10B:
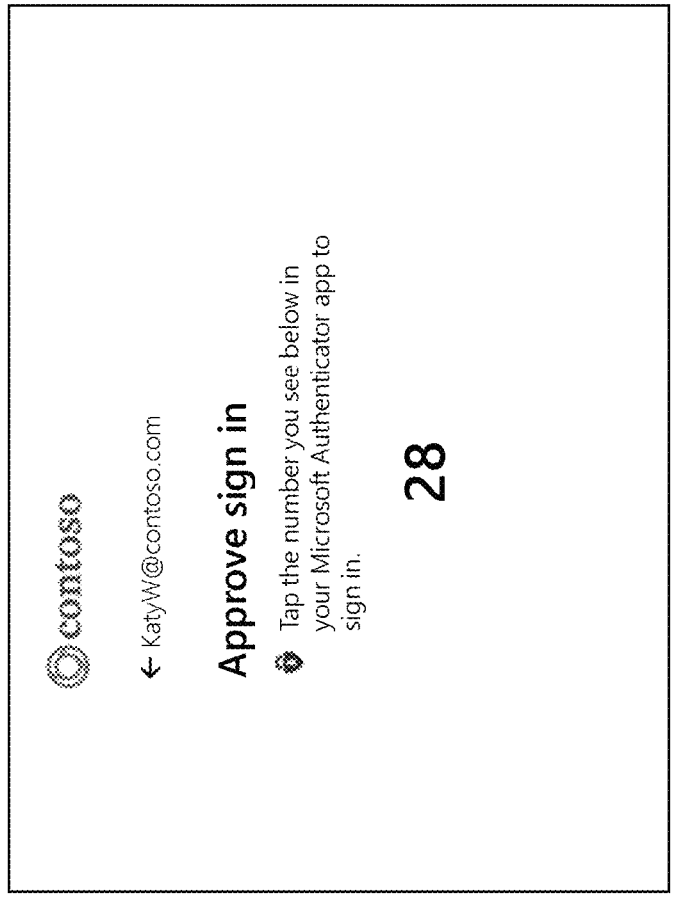
FIGS. 10A-10B illustrate a mobile authentication app and an application's login page further requiring a user to match the generated random number for enhanced security.
Figure 10A:
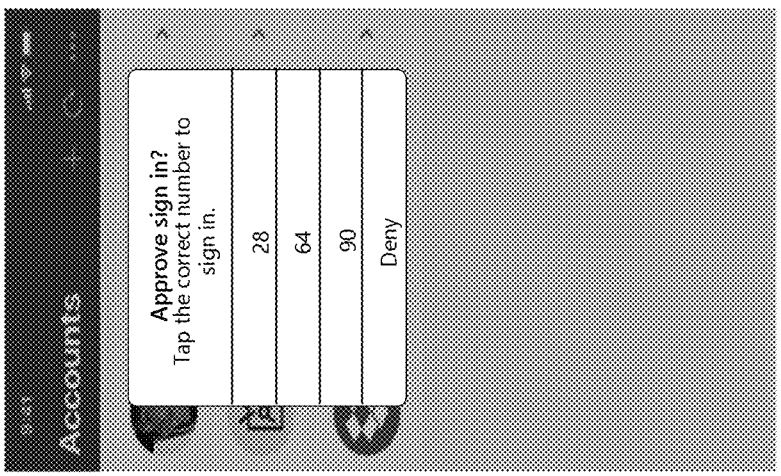

FIGS. 10A-10B further illustrates that the location-aware authentication is further combined with additional multi-factor authentication functions to further enhance the security of the user activities. As illustrated, after the user consents to the location share, the user is further required to use the authentication app to match the number generated at the user access device and the number displayed at the authentication app.

Figure 11B:
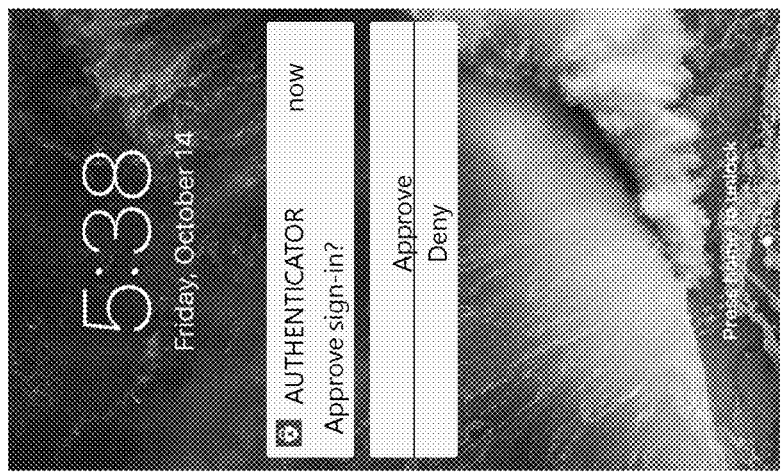
FIGS. 11A-11B illustrate various user interfaces of a mobile device prompting a user to approve or deny a sign-in request.
Figure 11A:
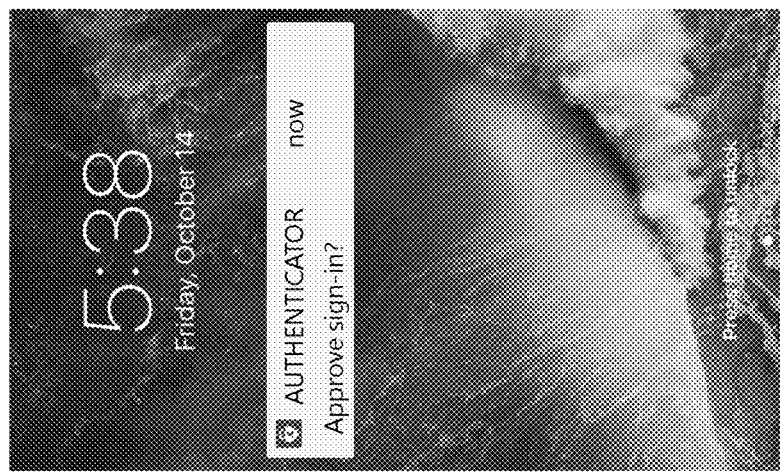

FIGS. 11A-11B further illustrate that after a user consent to location sharing once, the user may not be required to consent again for a predetermined period. During this period, the user may be able to simply tap the notification at the mobile device to consent to or deny the sign-in request.

Figure 12B:
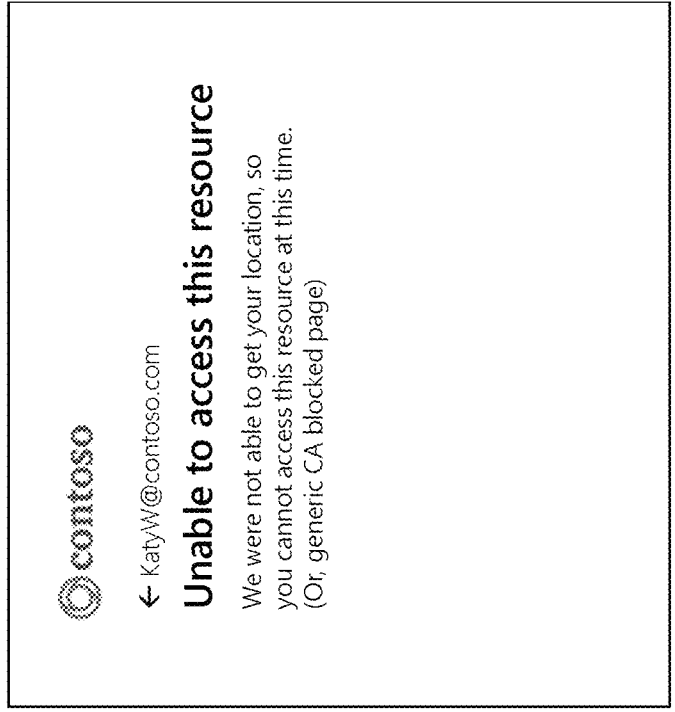
FIGS. 12A-12C illustrate various user interfaces of the application and the mobile device, indicating denying the user's sign-in request due to that the user's location is not accessible.
Figure 12A:
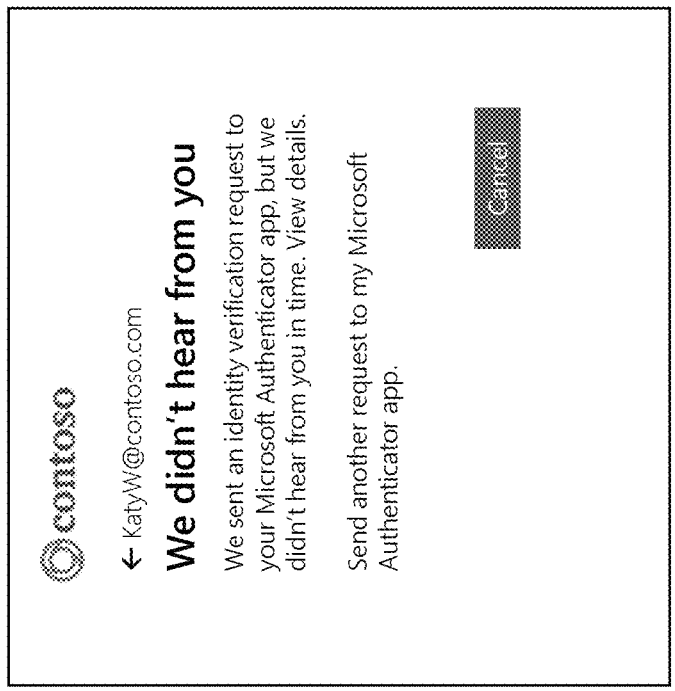
Figure 12C:
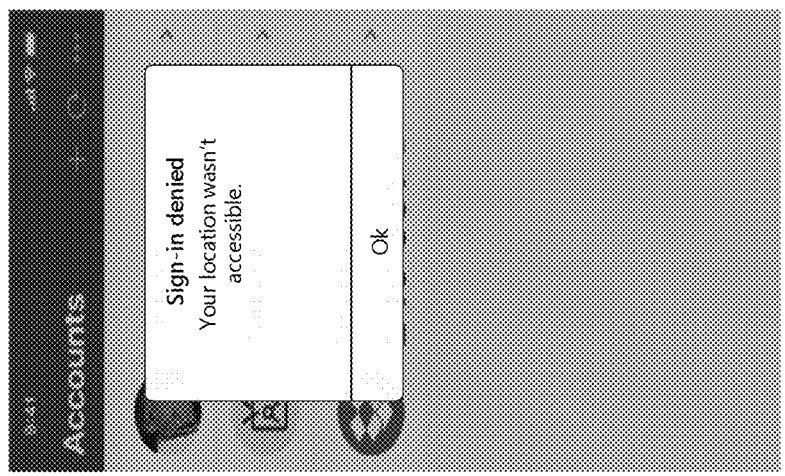

FIGS. 12A-12B illustrate various exemplary user interfaces that may be presented at the user access device when the location verification fails. FIG. 12C illustrates an exemplary user interface that may be presented at the authentication app when the location verification fails.

Figure 13C:
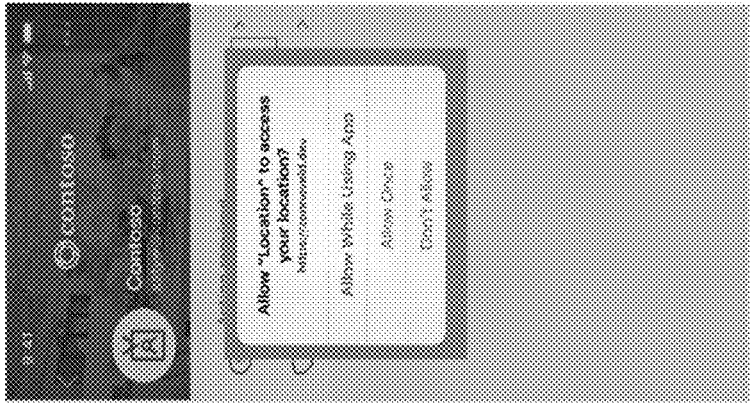
FIGS. 13A-13C illustrate various user interfaces of a mobile authentication app that allows users to manage location sharing settings.
Figure 13B:
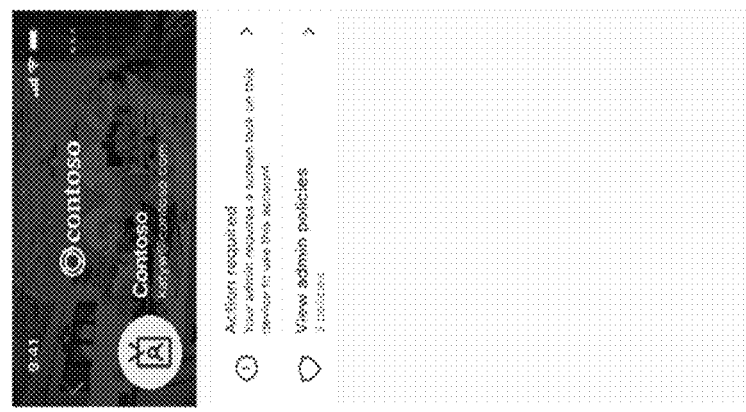
Figure 13A:
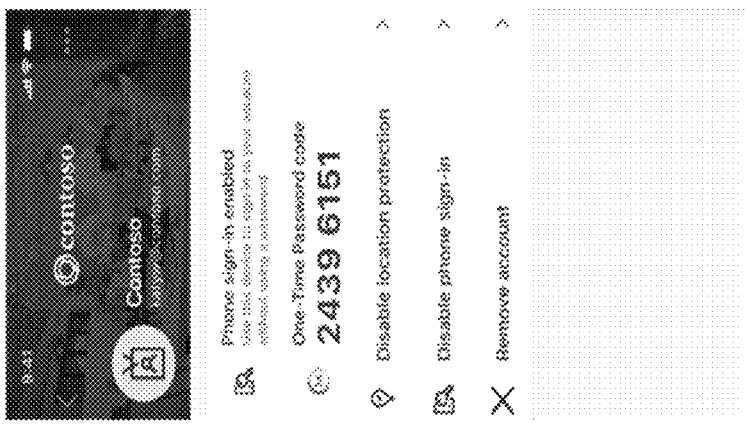

FIGS. 13A-13C illustrate various exemplary user interfaces that may be presented at the authentication app that allows the user to manage their location sharing settings.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 14:
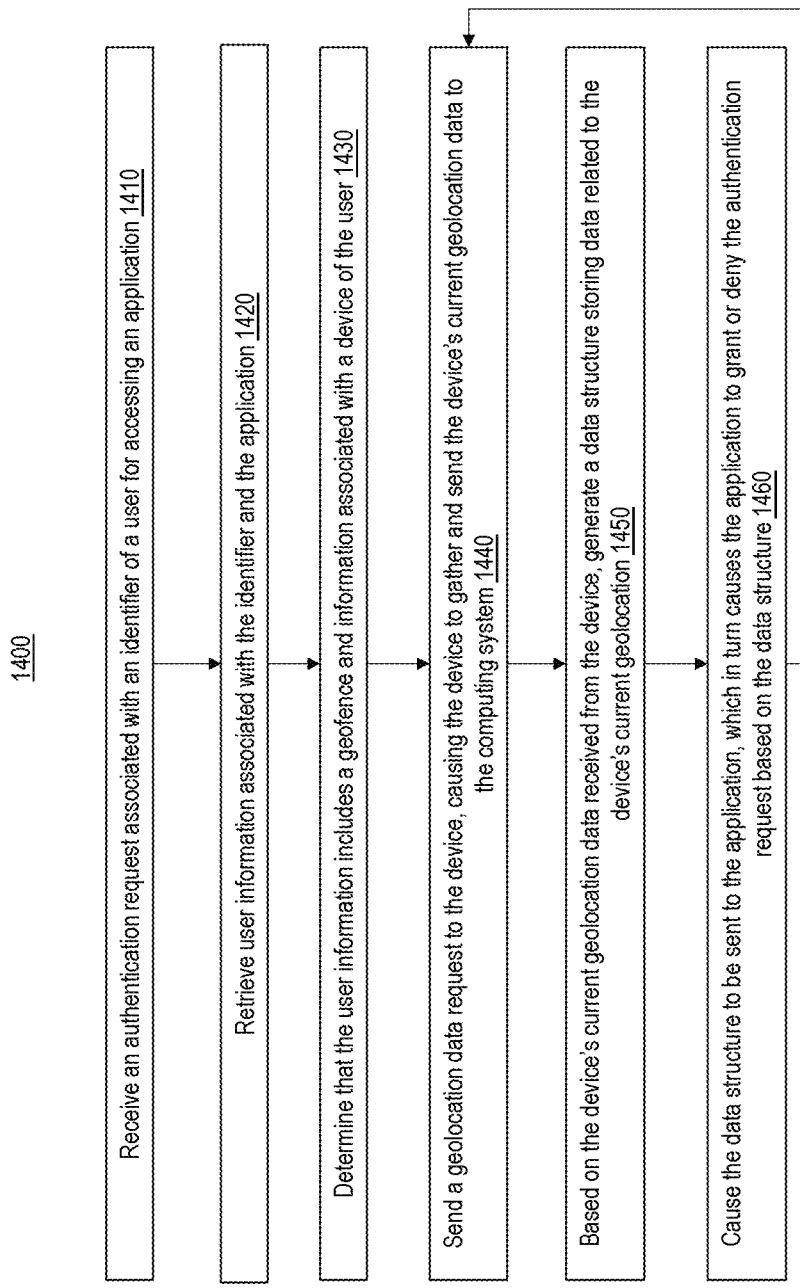
FIG. 14 illustrates a flowchart of an example method for location-aware authentication of user activities.

FIG. 14 illustrates a flowchart of an example method 1400 for location-aware authentication of user activities, which may be implemented at a computing system (e.g., an identity server 440, 540 or an application 220, 320 having identity management capabilities). The method 1400 includes receiving an authentication request associated with an identifier of a user for accessing an application (act 1410). The method 1400 further includes retrieving user information associated with the identifier and the application (act 1420) and determining that the user information includes a geofence and information associated with a device of the user (act 1430). Based on the geofence and the information associated with the device, the computing system sends a geolocation data request to the device, causing the device to gather and send the device's current geolocation data to the computing system (act 1440). Based on the device's current geolocation data received from the device, the computing system generates a data structure storing data related to the device's current geolocation (act 1450) and causes the data structure to be sent to the application, which in turn causes the application to grant or deny the authentication request. In some embodiments, the data structure storing the geolocation data has an expiration time. When the data structure expires, the computing system sends a geolocation data request again to the device (act 1440); based on the device's current geolocation data, generates a data structure storing data related to the device's current geolocation (act 1450); and causes the data structure to be sent to the application again (act 1460). This process repeats until the user logs out or the user session times out.

Finally, because the principles described herein may be performed in the context of a computing system (for example, each of the user device 210, 410, the application server 220, 320, 420, 520, the user access device 310, 510, user authenticator device 320, 520, identity server 440, 540, resource(s) storage 230, 330, 430, 530 may include one or more computing systems) some introductory discussion of a computing system will be described with respect to FIG. 15.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 15:
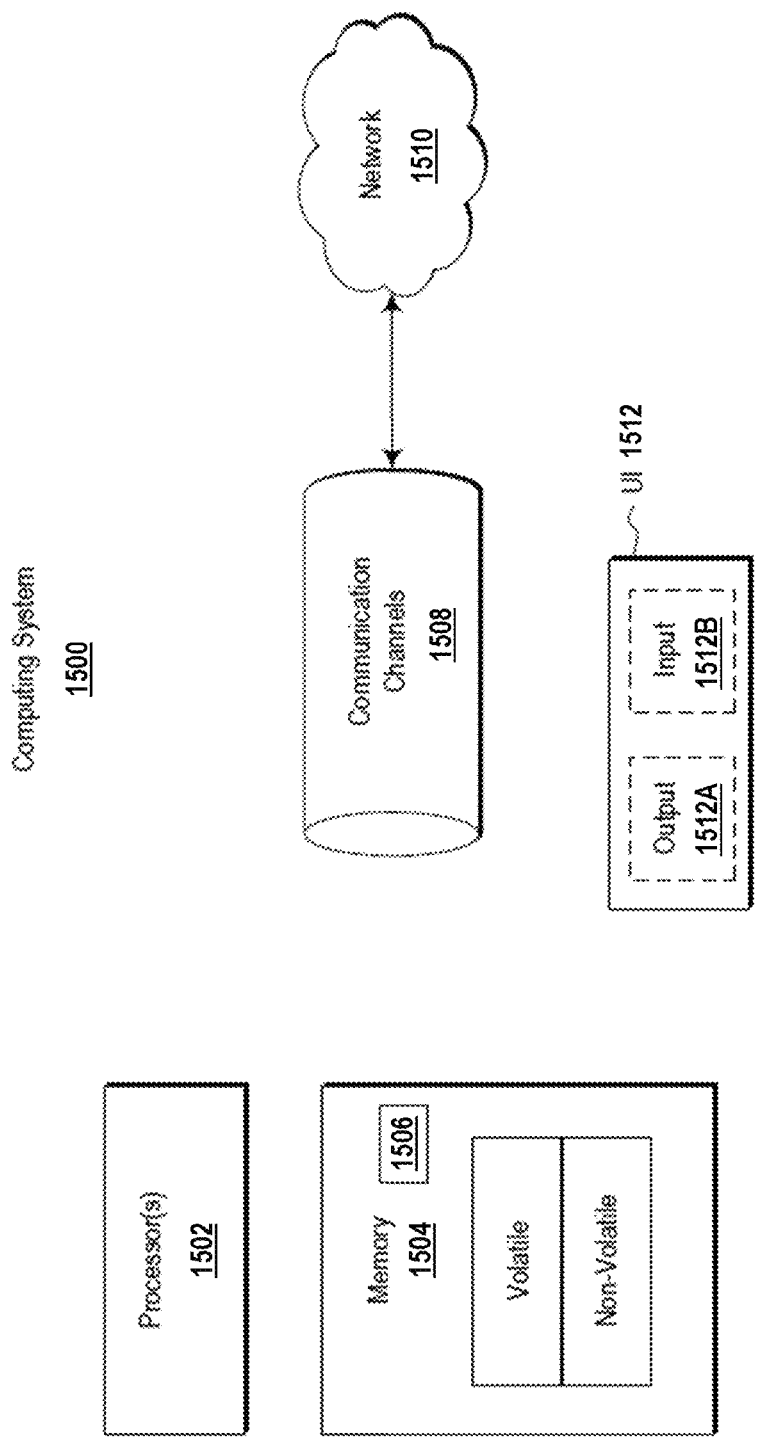
FIG. 15 illustrates an example computing system in which the principles described herein may be employed.

As illustrated in FIG. 15, in its most basic configuration, a computing system 1500 typically includes at least one hardware processing unit 1502 and memory 1504. The processing unit 1502 may include a general-purpose processor and may also include a field-programmable gate array (FPGA), an application-specific integrated circuit (ASIC), or any other specialized circuit. The memory 1504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1500 also has thereon multiple structures often referred to as an "executable component". For instance, memory 1504 of the computing system 1500 is illustrated as including executable component 1506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1504 of the computing system 1500. Computing system 1500 may also contain communication channels 1508 that allow the computing system 1500 to communicate with other computing systems over, for example, network 1510.

While not all computing systems require a user interface, in some embodiments, the computing system 1500 includes a user interface system 1512 for use in interfacing with a user. The user interface system 1512 may include output mechanisms 1512A as well as input mechanisms 1512B. The principles described herein are not limited to the precise output mechanisms 1512A or input mechanisms 1512B as such will depend on the nature of the device. However, output mechanisms 1512A might include, for instance, speakers, displays, tactile output, holograms and so forth. Examples of input mechanisms 1512B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 1500 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 1502 and memory 1504, as needed to perform their various functions.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more hardware processors; and
   one or more hardware storage devices having stored thereon computer-executable instructions that are structured such that, when executed by the one or more processors, configure the computing system to perform the following:
   receive an authentication request associated with an identifier of a user for accessing an application, wherein the authentication request includes a request to login to a user account;
   retrieve user information associated with the identifier and the application;
   determine whether the user account is associated with a geofence that requires the user to be within a predetermined area when the user logs into the user account in order for the authentication request to be granted; and either
   (A) only upon first determining that the user account is associated with a geofence that requires the user to be within the predetermined area when the user logs into the user account in order for the authentication request to be granted, perform the following:
      (i) send a consent notification and a geolocation data request to the device for causing the device to gather and send the device's current geolocation data to the computing system;
      (ii) upon being given consent, generate a data structure storing data related to the information associated with the identifier and any geolocation data received from the device corresponding to the device's current geolocation; and
      (iii) cause the data structure to be sent to the application, which in turn creates a user session if the authentication request is granted, the user session being set to expire in a predetermined timeout period, and causes the application to grant or deny the authentication request based on the information associated with the identifier and said any geolocation data received from the device corresponding to the device's current geolocation, so long as the predetermined timeout period has not expired; or alternatively
   (B) subsequent to determining that the user account is not associated with the geofence that requires the user to be within the predetermined area when the user logs into the user account in order for the authentication request to be granted, refrain from sending the consent notification and the geolocation data request to the device for causing the device to gather and send the device's current geolocation data to the computing system, based on the determination that the user account is not associated with the geofence.

2. The computing system of claim 1, wherein the authentication request includes a request for access to a portion of data, and the computing system determines whether the portion of data is associated with a geofence that requires any user to be within the geofence for the data access request to be granted.

3. The computing system of claim 2, wherein in response to determining that the portion of data is not associated with any geofence, the computing system refrains from gathering the device's current geolocation data.

4. The computing system of claim 1, wherein:
   the computing system is further configured to determine whether the device is located within the geofence; and
   the data structure stores a binary field indicating whether the device is located within the geofence.

5. The computing system of claim 4, wherein the computing system deletes the geolocation data associated with precise geolocation of the device after the determination of whether the device is located within the geofence.

6. The computing system of claim 1, wherein the computing system is configured to:
   send the consent notification at the device of the user before causing the device to gather the device's geolocation data; and
   in response to receiving the user's consent, cause the device to gather the device's current geolocation data.

7. The computing system of claim 1, wherein the user account is associated with a plurality of devices, and the computing system is configured to:
   determine whether one of the plurality of devices is a designated primary device; and
   (i) when it is determined the designated primary device exists, send the consent notification and/or the geolocation data request to the primary device; or alternatively
   (ii) when it is determined the designated primary device does not exist, send the consent notification and/or the geolocation data request to each of the plurality of devices associated with the user account.

8. The computing system of claim 1, wherein the computing system is further configured to:
   in response to detecting that an IP address of the device changes,
   revoke the data structure;
   send a second geolocation data request to the device, causing the device to gather the device's current geolocation data again;
   in response to receiving the device's current geolocation data again, generate a second data structure storing data associated with the device's current geolocation data; and
   send the second data structure to the application.

9. The computing system of claim 1, wherein:
   the geolocation data is obtained based on at least one of the following resources coupled to the device: (1) a Global Positioning System (GPS), (2) a Wi-Fi access point connected to the device, (3) another device connected to the device via Bluetooth connection.

10. The computing system of claim 1, wherein the computing system is further configured to receive a user input, defining the geofence.

11. The computing system of claim 7, wherein definition of the geofence is based on at least one of the following: (1) a particular country, a political state, or a territory of an organized political community under one civil government, (2) a particular building, (3) a particular campus of a particular organization, (4) an area of a latitude-longitude polygon, or (5) an area of a circle having a particular radius around a particular latitude-longitude center.

12. A method implemented at a computing system for location-aware authentication, the method comprising:
    receiving an authentication request associated with an identifier of a user for accessing an application, wherein the authentication request includes a request to login to a user account;
    retrieving user information associated with the identifier and the application;
    determining whether the user account is associated with a geofence that requires the user to be within a predetermined area when the user logs into the user account in order for the authentication request to be granted; and either
    (A) only upon first determining that the user account is associated with a geofence that requires the user to be within the predetermined area when the user logs into the user account in order for the authentication request to be granted, performing the following:
        (i) sending a consent notification and a geolocation data request to the device for causing the device to gather and send the device's current geolocation data to the computing system;
        (ii) upon being given consent, generating a data structure storing data related to the information associated with the identifier and any geolocation data received from the device corresponding to the device's current geolocation; and
        (iii) causing the data structure to be sent to the application, which in turn creates a user session if the authentication request is granted, the user session being set to expire in a predetermined timeout period, and causes the application to grant or deny the authentication request based on the information associated with the identifier and said any geolocation data received from the device corresponding to the device's current geolocation, so long as the predetermined timeout period has not expired; or alternatively
    (B) subsequent to determining that the user account is not associated with the geofence that requires the user to be within the predetermined area when the user logs into the user account in order for the authentication request to be granted, refraining from sending the consent notification and the geolocation data request to the device for causing the device to gather and send the device's current geolocation data to the computing system, based on the determination that the user account is not associated with the geofence.

13. The computing system of claim 12, wherein the authentication request includes a request for access to a portion of data, and the computing system determines whether the portion of data is associated with a geofence that requires any user to be within the geofence for the data access request to be granted.

14. A computer program product comprising one or more hardware storage devices having stored thereon computer-executable instructions that are structured such that, when executed by one or more processors of a computing system, the computer-executable instructions cause the computer system to perform the following:
    receive an authentication request associated with an identifier of a user for accessing an application, wherein the authentication request includes a request to login to a user account;
    retrieve user information associated with the identifier and the application;
    determine whether the user account is associated with a geofence that requires the user to be within a predetermined area when the user logs into the user account in order for the authentication request to be granted; and either
    (A) only upon first determining that the user account is associated with a geofence that requires the user to be within the predetermined area when the user logs into the user account in order for the authentication request to be granted, perform the following:
        (i) send a consent notification and a geolocation data request to the device for causing the device to gather and send the device's current geolocation data to the computing system;
        (ii) upon being given consent, generate a data structure storing data related to the information associated with the identifier and any geolocation data received from the device corresponding to the device's current geolocation; and
        (iii) cause the data structure to be sent to the application, which in turn creates a user session if the authentication request is granted, the user session being set to expire in a predetermined timeout period, and causes the application to grant or deny the authentication request based on the information associated with the identifier and said any geolocation data received from the device corresponding to the device's current geolocation, so long as the predetermined timeout period has not expired; or alternatively
    (B) subsequent to determining that the user account is not associated with the geofence that requires the user to be within the predetermined area when the user logs into the user account in order for the authentication request to be granted, refrain from sending the consent notification and the geolocation data request to the device for causing the device to gather and send the device's current geolocation data to the computing system, based on the determination that the user account is not associated with the geofence.

15. The computing system of claim 1, wherein the computing system is further configured to:
    when the user account is determined to be associated with a geofence, and upon expiration of the predetermined timeout period,
    resend the consent notification and/or the geolocation data request to the device for causing the device to gather and send the device's current geolocation data to the computing system;
    generate a data structure storing data related to the information associated with the identifier and any geolocation data received from the device corresponding to the device's current geolocation; and
    cause the data structure to be sent to the application which in turn creates a new user session or causes the user session to be renewed, the new user session or user session being set to expire in a new predetermined timeout period, and causes the application to grant or deny the authentication request based on the information associated with the identifier and said any geolocation data received from the device corresponding to the device's current geolocation, so long as the new predetermined timeout period has not expired.

* * * * *